US011912478B2

(12) United States Patent
LaBrecque et al.

(10) Patent No.: US 11,912,478 B2
(45) Date of Patent: Feb. 27, 2024

(54) DOSAGE REMINDER INDICATOR FOR CONTAINER LIDS

(71) Applicant: Twistwise LLC, Marshfield, MA (US)

(72) Inventors: Catherine Mary LaBrecque, Pembroke, MA (US); James M. Behmke, Pembroke, MA (US); Brian J. Hickey, Centereach, NY (US)

(73) Assignee: TWISTWISE LLC, Marshfield, MA (US)

( * ) Notice: Subject to any disclaimer, the term of this patent is extended or adjusted under 35 U.S.C. 154(b) by 239 days.

(21) Appl. No.: 17/190,391

(22) Filed: Mar. 2, 2021

(65) Prior Publication Data

US 2021/0269204 A1 Sep. 2, 2021

Related U.S. Application Data

(60) Provisional application No. 62/984,020, filed on Mar. 2, 2020.

(51) Int. Cl.

| | |
|---|---|
| ***B65D 51/24*** | (2006.01) |
| ***A61J 7/04*** | (2006.01) |
| ***A61J 1/14*** | (2023.01) |

(52) U.S. Cl.
CPC .......... *B65D 51/245* (2013.01); *A61J 1/1412* (2013.01); *A61J 7/04* (2013.01)

(58) Field of Classification Search
CPC .......... B65D 51/245; A61J 1/1412; A61J 7/04
See application file for complete search history.

(56) References Cited

U.S. PATENT DOCUMENTS 3,227,127 A 1/1966 Gayle
3,285,459 A * 11/1966 Gahm .................. A61J 7/0046 206/218

(Continued)

FOREIGN PATENT DOCUMENTS

CA 2429912 A1 * 11/2003 ................ A61J 7/04
CN 201131920 10/2008

(Continued)

OTHER PUBLICATIONS

"Remind-A-Cap", online: https://remindacap.com/, accessed Mar. 1, 2021, 8 pages.

(Continued)

*Primary Examiner* — J. Gregory Pickett
*Assistant Examiner* — Abigail Elizabeth Guidry
(74) *Attorney, Agent, or Firm* — BEHMKE INNOVATION GROUP LLC; James M. Behmke; James J. Wong

(57) ABSTRACT

Embodiments herein provide for a dosage reminder indicator for containers, allowing a user to align a dosage reminder (e.g., "last" or "next") with timing indicators (e.g., days, times). In one embodiment, an inner dial has first engaging members and an outer ring has second engaging members mating with the first engaging members, where a dosage reminder indicator and a plurality of dosage timing indicators are opposingly located on either the inner dial or outer ring. The inner dial and the outer ring are rotatably engaged with respect to each other such that the dosage reminder indicator points to any selected one of the plurality of dosage timing indicators in a secured position (when the first and second engaging members are mated), where rotation is permitted based on user-applied force to disengage mating of the first and second engaging members, while the inner dial and the outer ring remain rotatably engaged.

24 Claims, 38 Drawing Sheets

(56) References Cited

U.S. PATENT DOCUMENTS

| | | | | | |
|---|---|---|---|---|---|
| 3,495,567 | A | 2/1970 | Hayes et al. | | |
| 4,011,829 | A * | 3/1977 | Wachsmann | B65D 50/046 | 206/534 |
| 4,347,804 | A * | 9/1982 | Villa-Real | A61J 7/04 | 206/459.1 |
| 4,419,016 | A * | 12/1983 | Zoltan | G08B 3/10 | 221/2 |
| 4,432,300 | A * | 2/1984 | Lyss | B65D 83/0463 | 206/534 |
| 4,501,370 | A * | 2/1985 | Kelley | A61J 7/04 | 116/308 |
| 5,009,338 | A * | 4/1991 | Barker | A61J 7/04 | 215/230 |
| 5,197,616 | A * | 3/1993 | Buono | B65D 50/041 | 215/206 |
| 5,271,353 | A * | 12/1993 | Besthorne | A61J 7/04 | 116/318 |
| 5,377,614 | A | 1/1995 | Glazer | | |
| 5,611,444 | A * | 3/1997 | Garby | A61M 15/0068 | 116/318 |
| 5,638,970 | A * | 6/1997 | Garby | G06M 1/248 | 215/230 |
| 6,003,467 | A * | 12/1999 | Shelton-Ferrell | G09F 11/23 | 116/315 |
| 6,152,067 | A * | 11/2000 | Mathison | A61J 7/04 | 206/459.1 |
| 6,324,123 | B1 * | 11/2001 | Durso | A61J 7/0481 | 368/10 |
| 6,789,497 | B1 | 9/2004 | Aiken | | |
| 6,796,267 | B2 | 9/2004 | Dubarry | | |
| 6,802,279 | B1 * | 10/2004 | Johnson | G09F 11/23 | 40/310 |
| 7,314,022 | B2 | 1/2008 | Sollaccio | | |
| 7,658,162 | B2 * | 2/2010 | Kreshek | G09F 11/23 | 206/534 |
| 7,735,684 | B2 | 6/2010 | Coe et al. | | |
| 7,878,350 | B2 | 2/2011 | Ramoundos | | |
| 7,907,477 | B2 * | 3/2011 | Puzia | G04G 13/026 | 215/230 |
| 8,371,464 | B2 * | 2/2013 | Rachuk | A61M 1/60 | 215/277 |
| 8,704,699 | B2 | 4/2014 | Geswender | | |
| 8,763,553 | B1 * | 7/2014 | Shannehan | A61J 7/04 | 116/308 |
| 8,857,617 | B2 * | 10/2014 | Balakier | B65D 41/06 | 206/540 |
| 9,021,981 | B2 | 5/2015 | Raiti De Boyles | | |
| 10,010,486 | B2 | 7/2018 | Nazginov | | |
| 10,201,479 | B2 | 2/2019 | Nazginov | | |
| 10,213,365 | B1 | 2/2019 | Sukkarieh | | |
| 2004/0144677 | A1 * | 7/2004 | Miller | A61J 7/04 | 206/459.1 |
| 2006/0124501 | A1 * | 6/2006 | McNeely | B65D 51/245 | 206/534 |
| 2006/0180566 | A1 * | 8/2006 | Mataya | A61J 1/1425 | 215/230 |
| 2016/0166468 | A1 * | 6/2016 | John Samuel | A61J 7/04 | 206/438 |

FOREIGN PATENT DOCUMENTS

| | | | |
|---|---|---|---|
| GB | 2327138 | 1/1999 | |
| WO | WO-2019242650 A1 * | 12/2019 | A61J 1/03 |

OTHER PUBLICATIONS

"Take-n-Slide", online: https://www.take-n-slide.com/, accessed Mar. 1, 2021, 6 pages.

"Jini Pill Magic 7 Smart Weekly Pill Organizer", online: wantitall.co.za, accessed Mar. 1, 2021, 2 pages.

"Remind-A-Cap: Pill Bottle Cap", online: healthcarepackaging.com, accessed Mar. 1, 2021, 2 pages.

"TimerCap", online: timercap.com, accessed Mar. 1, 2021, 3 pages.

"RXCap", online: https://rxcap.com/, accessed Mar. 1, 2021, 9 pages.

"The Didit", online: http://thedidit.com/, accessed Mar. 2, 2021, 2 pages.

"Hourbands", online: https://hourbands.com/, accessed Mar. 2, 2021, 9 pages.

* cited by examiner

DOSAGE REMINDER INDICATOR FOR CONTAINER LIDS

RELATED APPLICATION

This application claims priority to U.S. Prov. Appl. No. 62/984,020, filed Mar. 2, 2020, entitled CONTAINER LID WITH DOSAGE INDICATOR, by Catherine Mary LaBrecque, et al., the contents of which are incorporated herein by reference.

TECHNICAL FIELD

The present disclosure relates generally to containers for dosage-based consumable goods, and, more particularly, to a dosage reminder indicator for containers and container lids.

BACKGROUND

The administration of medications, drugs, supplements, vitamins, nutraceuticals, and so on often are in the form of pills, tablets, capsules, soft-gels, chewables (e.g., "gummies"), powders, or liquids. Many of these consumable goods are dosage-based, whether through prescription, recommendation, or personal preference. For example, certain medications are required to be taken twice daily, certain supplements recommend once-daily dosage, and certain other medicines restrict their consumption to being restricted to at least a given length of time between dosages (e.g., no less than 4-6 hours since the last dose).

However, people taking the dosages often forget the last time they consumed the goods, and are left wondering whether they have forgotten a dose, how long it has been since their last dose, or when their next dose should be. In this instance, the person is left with the option of potentially skipping the dose, taking an additional dose (which may be wasteful or potentially dangerous), or taking a next dose too soon.

SUMMARY

The embodiments herein provide for a dosage reminder indicator for container lids. In particular, in certain embodiments, the dosage reminder indicator allows a user to rotate a dial to align a reminder indicator (last taken or next take time) with a timing indicator (e.g., days of the week, morning/evening, times/hours of the day, etc.).

In one embodiment, an illustrative apparatus comprises: an inner dial having one or more first engaging members; an outer ring having one or more second engaging members mating with one or more of the one or more first engaging members; a dosage reminder indicator on one of either the inner dial or the outer ring; a plurality of dosage timing indicators on the other of either the inner dial or the outer ring; wherein the inner dial and the outer ring are rotatably engaged with respect to each other such that the dosage reminder indicator points to any of a selected one of the plurality of dosage timing indicators in a secured position when one or more of the one or more first engaging members are mated with one or more of the one or more second engaging members; and wherein rotation between the inner dial and the outer ring is permitted based on user-applied force to disengage mating of the one or more first engaging members from the one or more second engaging members while the inner dial and the outer ring remain rotatably engaged.

In one specific embodiment, the apparatus further comprises a spring mechanism configured to press the inner dial against the outer ring, wherein the user-applied force comprises pushing on the one of either the inner dial or the outer ring to disengage mating of the one or more first engaging members from the one or more second engaging members while the inner dial and the outer ring remain rotatably engaged and rotation between the inner dial and the outer ring is thus permitted. In one embodiment, one of either the one or more first engaging members or the one or more second engaging members comprise raised tabs, and wherein the other of either the one or more first engaging members or the one or more second engaging members comprise receptive detents, and wherein the raised tabs are mated with receptive detents when engaged, and rotation between the inner dial and the outer ring is permitted based on user-applied force disengaging mating of the raised tabs from the receptive detents and allowing the raised tabs to pass by the receptive detents while the inner dial and the outer ring remain rotatably engaged.

In another specific embodiment, one of either the one or more first engaging members or the one or more second engaging members comprise flexible protruding members, and the other of either the one or more first engaging members or the one or more second engaging members comprise receptive detents, and wherein the flexible protruding members are mated with receptive detents when engaged, and rotation between the inner dial and the outer ring is permitted based on user-applied force flexibly disengaging mating of the flexible protruding members from the receptive detents and allowing the flexible protruding members to pass by the receptive detents in a flexed state while the inner dial and the outer ring remain rotatably engaged. In one embodiment, the flexible protruding members and receptive detents are arranged in a one-way ratcheting orientation.

In still another embodiment, a container lid with dosage reminder indicator illustratively comprises a rotating dial and a stationary outer ring that secures to the container. The rotating dial may itself comprise a grip member, a next/last dosage reminder indicator, and a plurality of outwardly protruding members, which engage to allow positionally secured rotation of the rotating dial within the outer ring. The outer ring, conversely, may comprise a plurality of dosage timing indicators, optional knurling (or other gripping aid/design), and a plurality of engaging members configured to allow positionally secured rotation of the rotating dial by engaging the plurality of outwardly protruding members of the rotating dial. The outer ring may comprise a closure mechanism to securely engage with a corresponding closure mechanism of a container.

In certain embodiments, the indicator/container lid is manufactured to correspond to a particular type of container. In certain other embodiments, the indicator/container lid comprises modular components that may be combined to create a customized product.

Other embodiments of the present disclosure may be discussed in the detailed description below, and the summary above is not meant to be limiting to the scope of the invention herein.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

As noted above, pills, tablets, capsules, soft-gels, chewables, powders, or liquids are often used to administer medications, drugs, supplements, vitamins, nutraceuticals, and so on. As also noted above, dosage-based consumable goods (e.g., prescriptions, recommendations, or personal preferences) are often subject to forgetful human behavior. In particular, by not knowing the last time a user consumed the goods or the next time the user is supposed to consume the goods, there is increased risk in skipping a dose, taking an additional dose, or taking a next dose too soon. This can be particularly problematic or worrisome for the user or their caretakers, and non-adherence (or non-compliance) is a major problem effecting pharmaceuticals where users do not take their medications.

Current solutions available to address human forgetfulness are often based on complex mechanisms, such as complicated rings, springs, and/or parts to set, most of which have a learning curve and could be inadvertently adjusted during opening or closing of the container. There are also a number of battery-operated timers or smartphone-connected sensors, which offer an overly precise solution that requires battery replacement or expensive parts to manufacture. Still further products available today may comprise automatically adjusting operations (dials, sensors, etc.), which set dosage based on the last time the container was used (opened, moved, etc.). However, such models may create further problems than necessary, since opening and/or moving a container does not necessarily coincide with actually taking a dose, resulting in frustrating resetting or troublesome inaccuracies.

The techniques herein, however, alleviate these concerns with a novel design that is easy to use, reduces erroneous movement, and effectively provides for increased dosage adherence. In particular, the embodiments herein are directed to a dosage reminder indicator for container lids, where a user can rotate a dial to align a reminder indicator (last taken or next take time) with a timing indicator (e.g., days of the week, morning/evening, time/hours of the day, etc.).

Figure 1A:
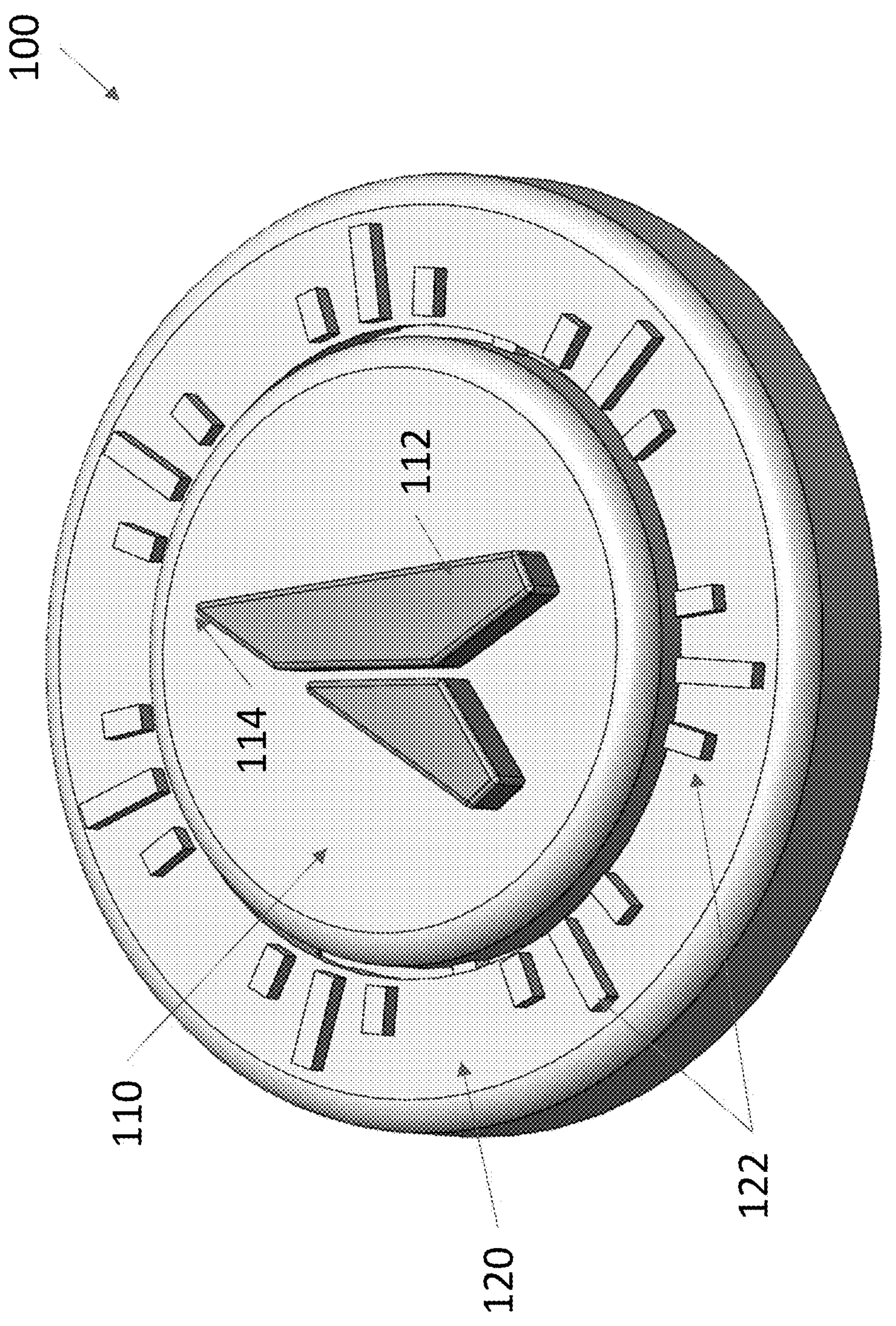
FIGS. 1A-1F illustrate an example of a dosage reminder indicator apparatus for containers according to one or more embodiments of the present disclosure.

In particular, FIGS. 1A-1F illustrate an example of a dosage reminder indicator apparatus 100 for containers according to one or more embodiments of the present disclosure. In particular, FIG. 1A illustrates a top perspective view of an illustrative a dosage reminder indicator apparatus 100 having an inner dial 110 and outer ring 120, that are rotatably engaged with each other. As shown, a grip member 112 may form a dosage reminder indicator 114 by coming to a point (e.g., an arrow, triangle, etc.), which corresponding points to an opposing dosage timing indicator 122, depending upon the relative position of the inner dial and the outer ring. (Note that the timing indicators 122 may be shown symbolically as raised features, though as described below, any symbol, word, letter, etc., may be used, and the generic "indicator" 122 in FIG. 1A is not meant to be limiting.)

Figure 1C:
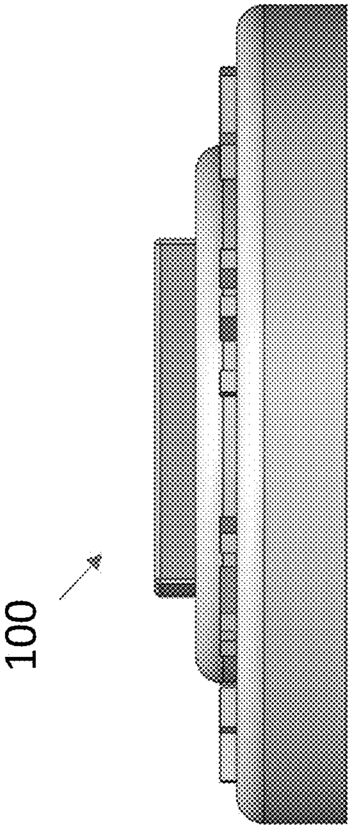
Figure 1B:
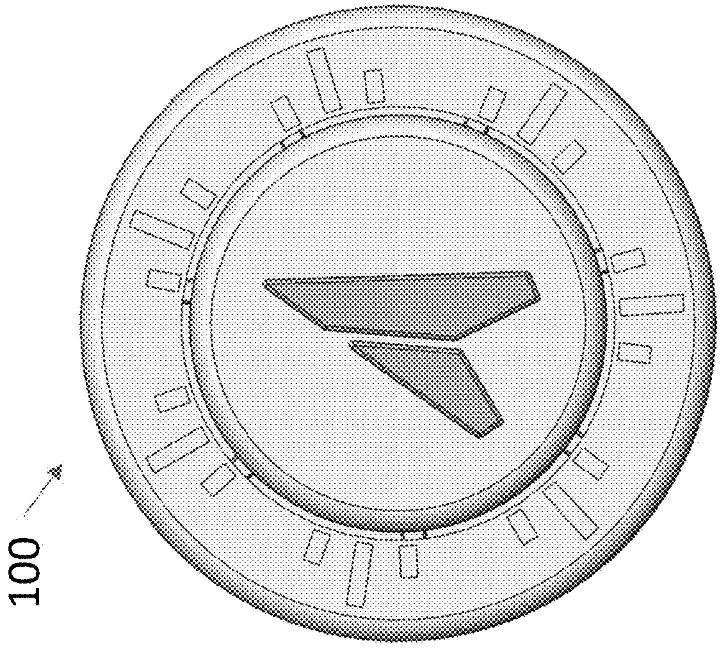

Notably:

FIG. 1B illustrates a top view of an illustrative a dosage reminder indicator apparatus 100.

FIG. 1C illustrates a side view of an illustrative a dosage reminder indicator apparatus 100.

Figure 1E:
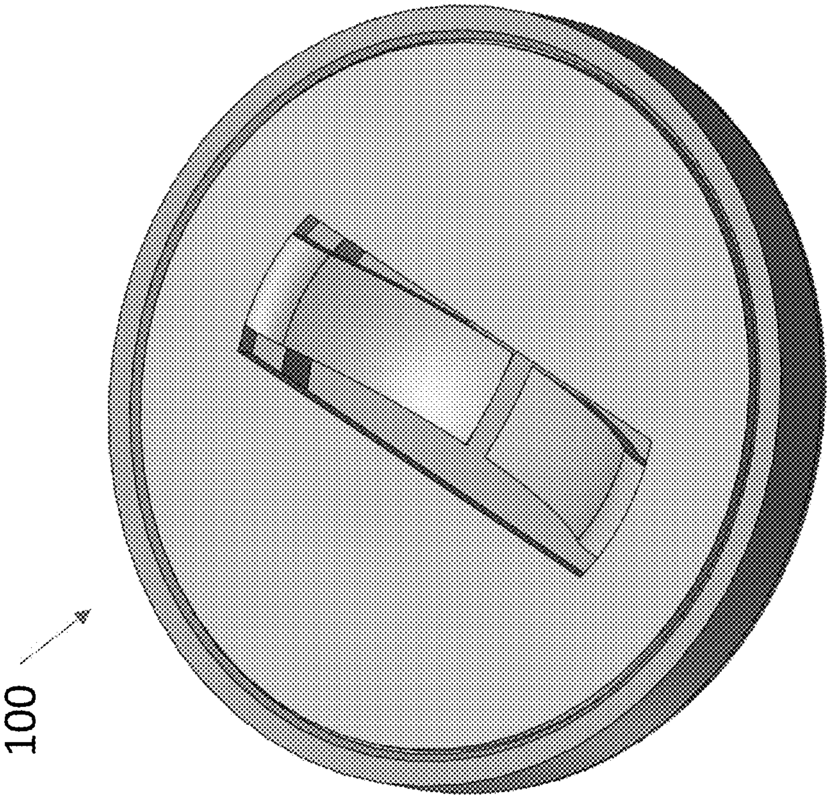
Figure 1D:
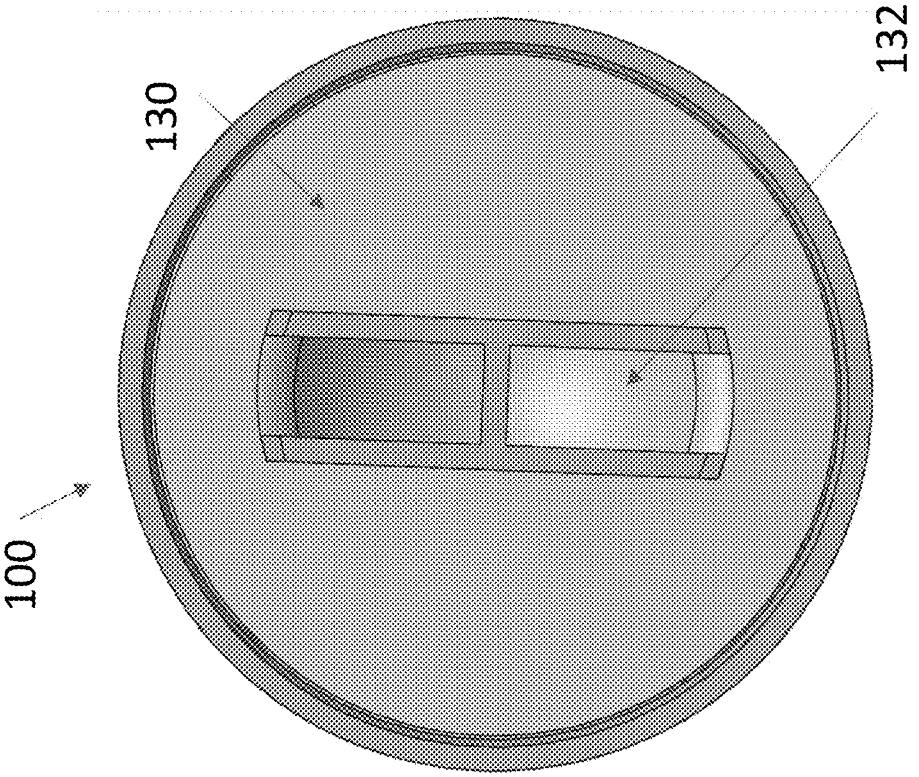

FIG. 1D illustrates a bottom view of an illustrative a dosage reminder indicator apparatus 100. As can now be seen (and described below), spring mechanism/base plate 130 is shown with an example spring mechanism 132.

FIG. 1E illustrates a bottom perspective view of an illustrative a dosage reminder indicator apparatus 100.

Figure 1F:
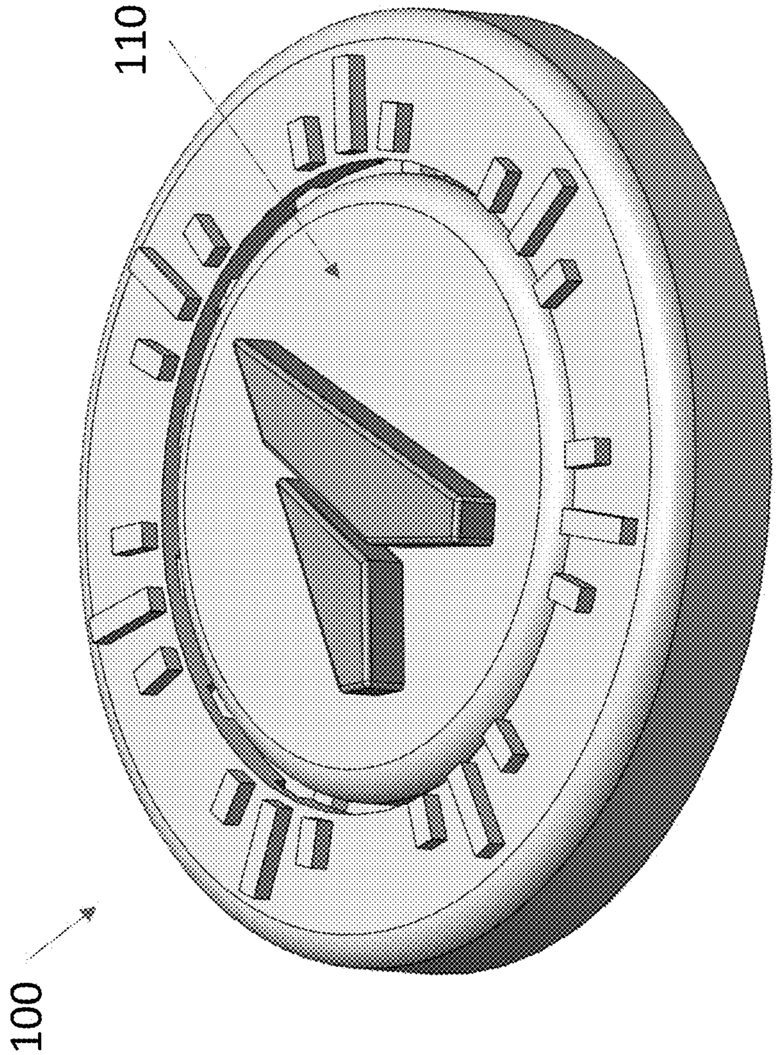

FIG. 1F illustrates an example of the inner dial 110 being depressed and turned ("push to turn") as described below.

Figure 2A:
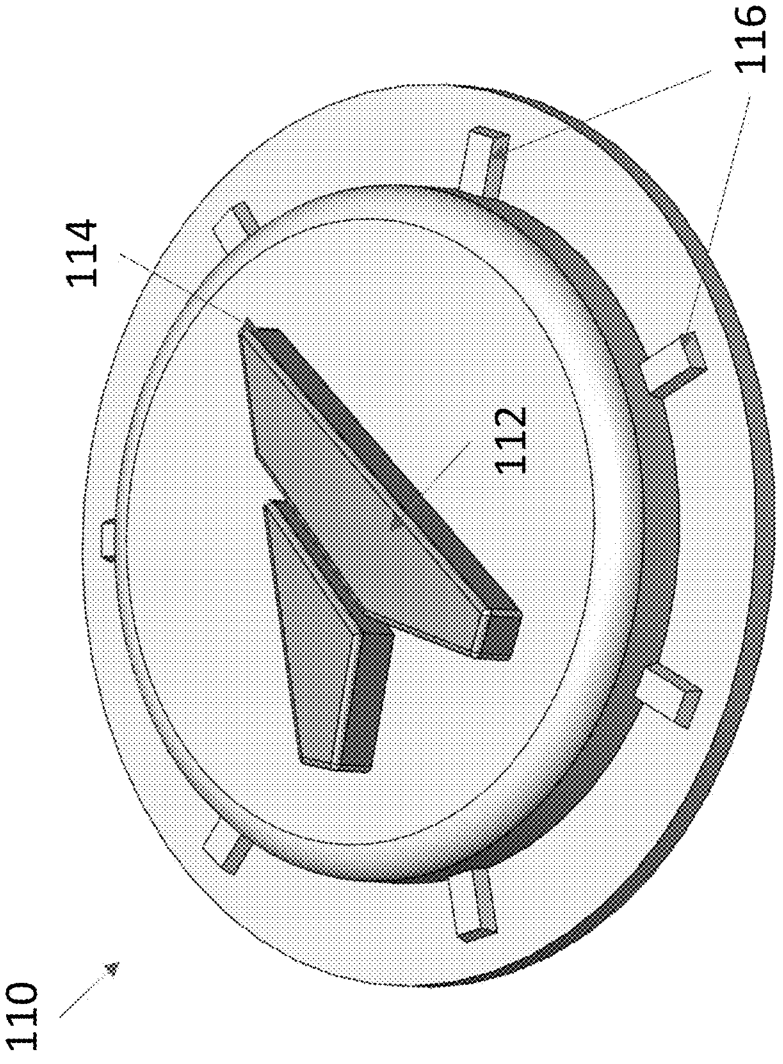
FIGS. 2A-2E illustrate an example inner dial of a dosage reminder indicator apparatus for containers according to one or more embodiments of the present disclosure.

FIGS. 2A-2E illustrate an example inner dial 110 of a dosage reminder indicator apparatus 100 for containers according to one or more embodiments of the present disclosure. In particular, FIG. 2A illustrates a top perspective view of an illustrative inner dial 110 of a dosage reminder indicator apparatus 100. Specifically, the inner dial may have a planar level with one or more raised tabs 116, as shown, which, as described below, engage opposing engaging members (receptive detents 126).

Figure 2C:
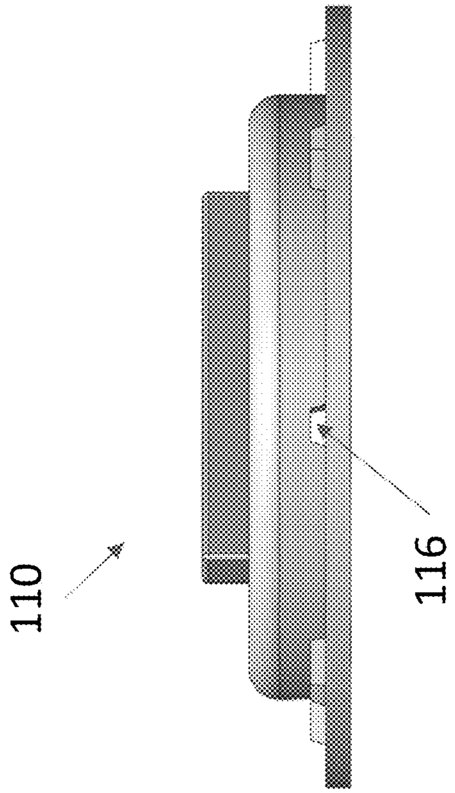
Figure 2B:
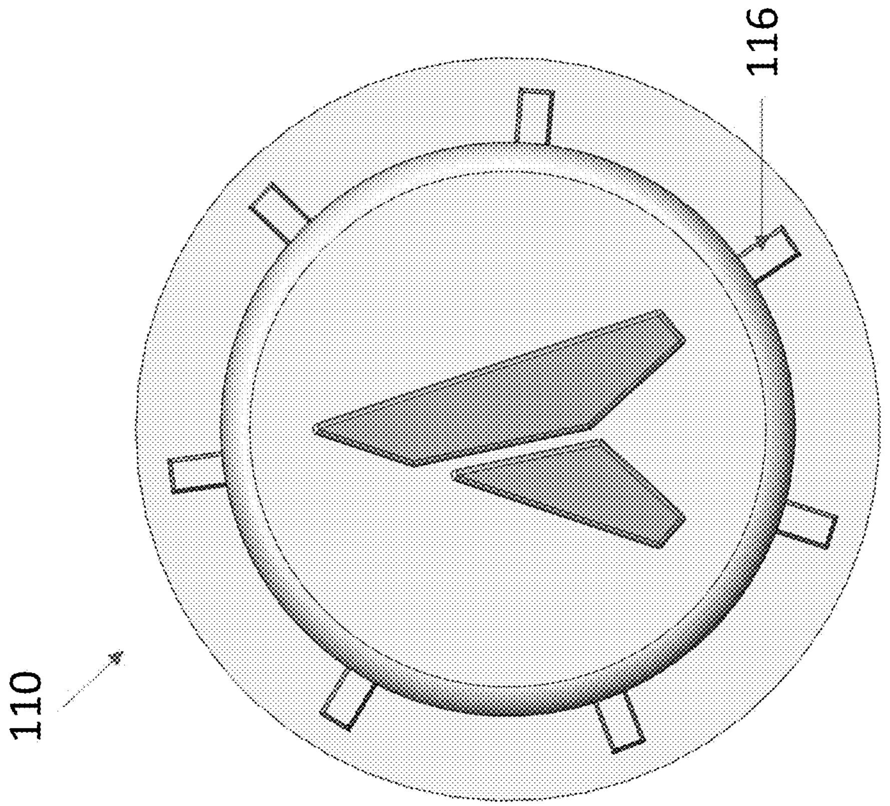

Notably:

FIG. 2B illustrates a top view of an illustrative inner dial 110 of a dosage reminder indicator apparatus 100.

FIG. 2C illustrates a side view of an illustrative inner dial 110 of a dosage reminder indicator apparatus 100.

Figure 2E:
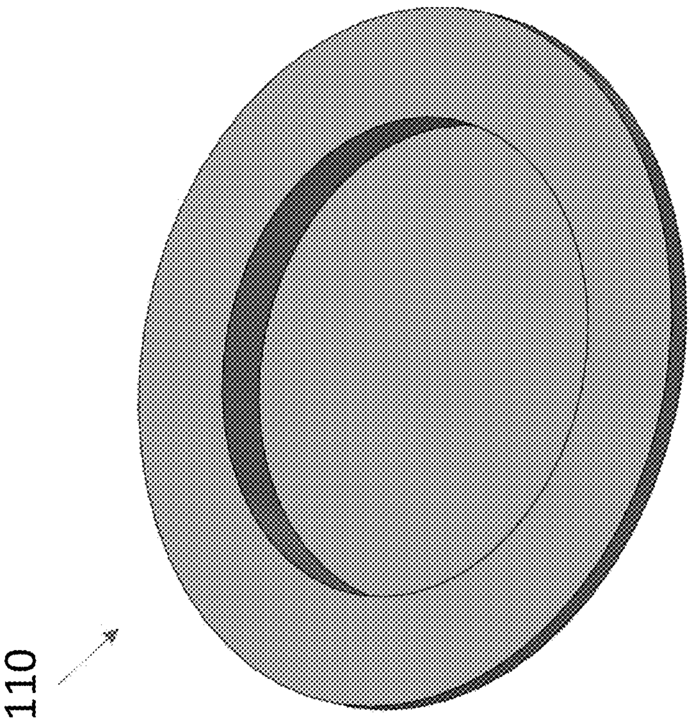
Figure 2D:
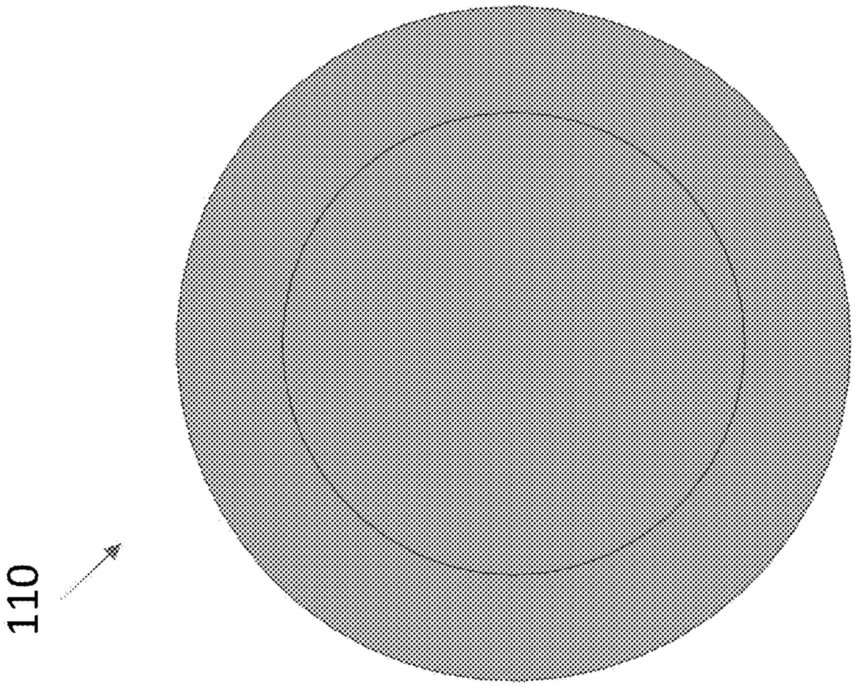

FIG. 2D illustrates a bottom view of an illustrative inner dial 110 of a dosage reminder indicator apparatus 100.

FIG. 2E illustrates a bottom perspective view of an illustrative inner dial 110 of a dosage reminder indicator apparatus 100.

It is worth specifically noting that two primary considerations on the type of dosage reminder indicator are covered herein; namely, when the next dose should occur ("take next") or else when the last dose was taken ("last taken"). For example, assume that a user with a daily vitamin takes a vitamin on a Wednesday. According to the "last taken" model, the user would then rotate the dial with a "last taken indicator" (e.g., "LAST") from "Tuesday" to "Wednesday" to indicate that the last dose was taken on Wednesday of that week. On the other hand, according to the "take next" model, the user would alternatively rotate the dial with a "take next indicator" (e.g., "NEXT") from "Wednesday" to "Thursday" to indicate that the next dose to be taken that week should be on Thursday. Effectively the result of the reminder is the same: that a dose was taken Wednesday and the next dose is Thursday, but the instructions of the lid 100, and preferably a notice on the lid 100 (e.g., dial 110 or outer ring 120) itself would be helpful to a user to best understand what the indicator alignment is, in fact, indicating. The present disclosure, therefore, refers to the dosage reminder indicator 114 herein as simply the "next/last dosage reminder indicator", though only one mode would be used on any real-life container lid 100, as will be appreciated by those skilled in the art.

Figure 3A:
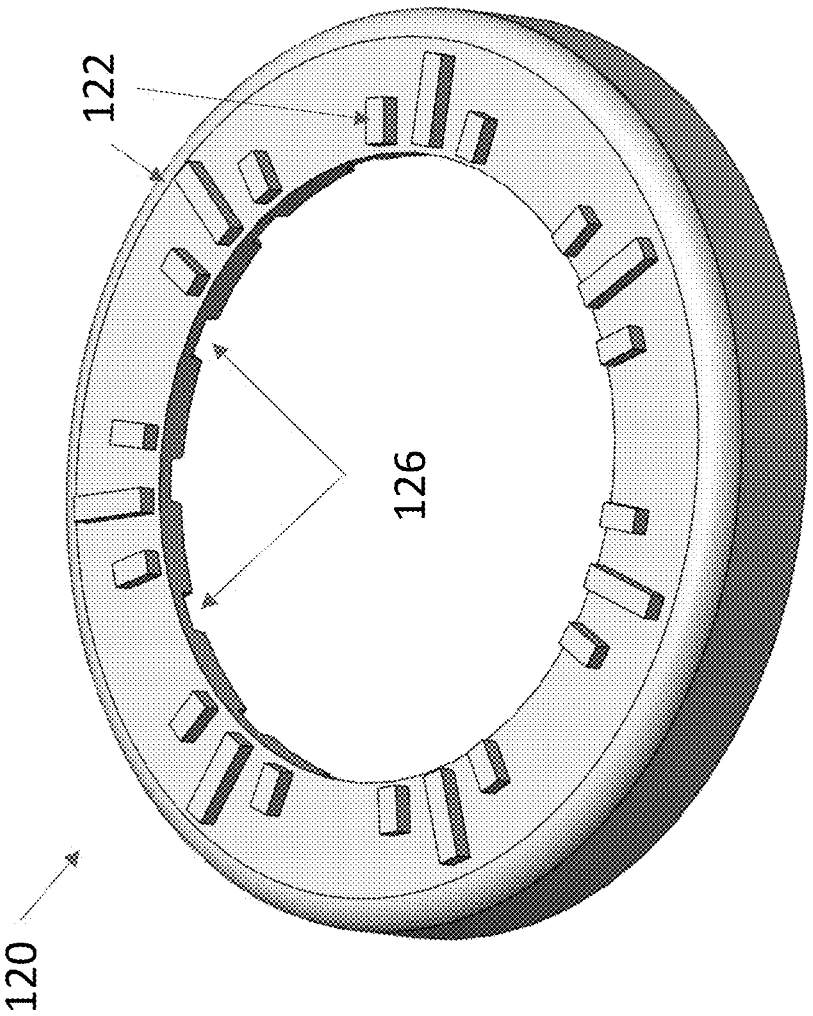
FIGS. 3A-3E illustrate an example outer ring of a dosage reminder indicator apparatus for containers according to one or more embodiments of the present disclosure.

FIGS. 3A-3E illustrate an example outer ring 120 of a dosage reminder indicator apparatus 100 for containers according to one or more embodiments of the present disclosure. In particular, FIG. 3A illustrates a top perspective view of an illustrative outer ring 120 of a dosage reminder indicator apparatus 100. Specifically, the underside of the outer ring may have a one or more receptive detents 126, which, as described herein, mate with opposing raised tabs 116 in selected positions.

Figure 3C:
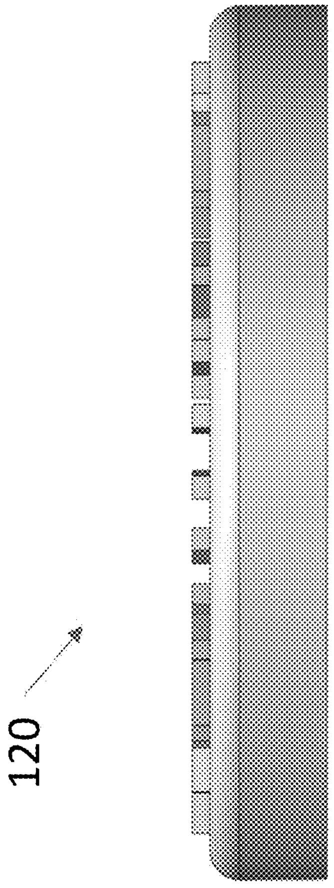
Figure 3B:
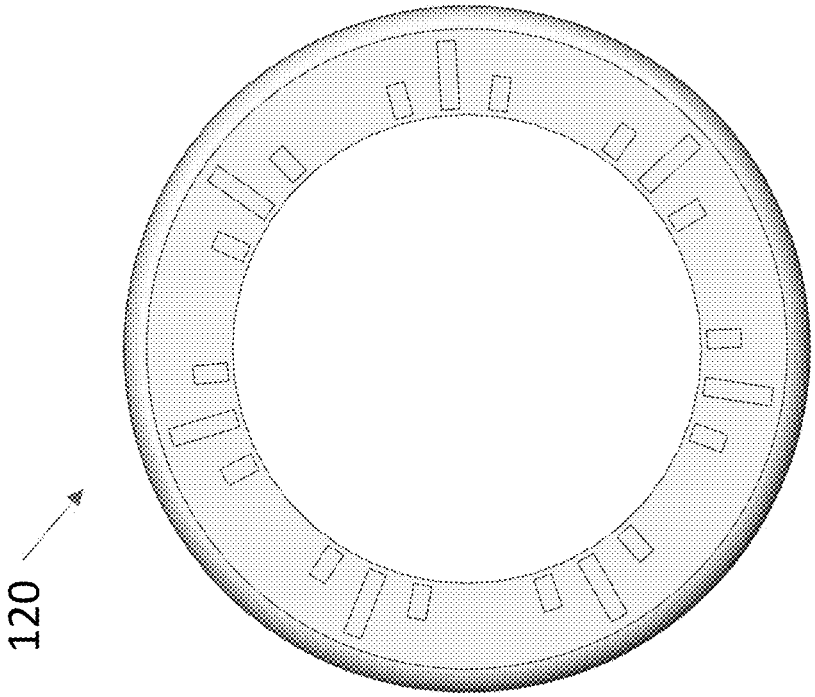

Notably:

FIG. 3B illustrates a top view of an illustrative outer ring 120 of a dosage reminder indicator apparatus 100.

FIG. 3C illustrates a side view of an illustrative outer ring 120 of a dosage reminder indicator apparatus 100.

Figure 3E:
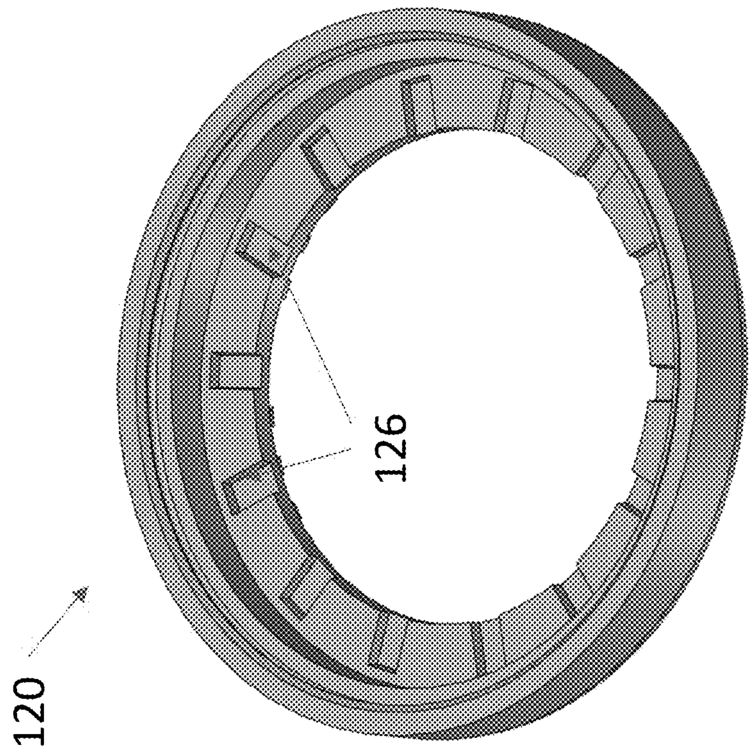
Figure 3D:
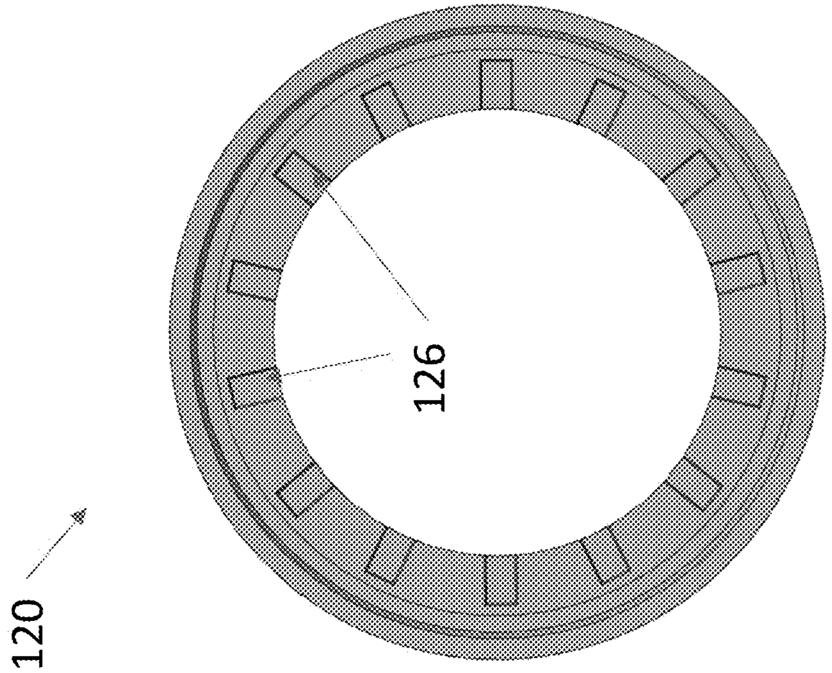

FIG. 3D illustrates a bottom view of an illustrative outer ring 120 of a dosage reminder indicator apparatus 100.

FIG. 3E illustrates a bottom perspective view of an illustrative outer ring 120 of a dosage reminder indicator apparatus 100.

As mentioned above, the engaging members 116/126 allow for positionally secured rotation of the inner dial 110 within the outer ring 120 (and, notably, may be on either side, and either the inner dial or the outer ring may be the moving part, depending upon configuration). That is, the embodiments herein provide for the inner dial 110 to be disengaged from the outer ring 120 through user-applied force (e.g., push-to-turn), and then turned in a rotating manner (e.g., in any direction), where the illustrative raised tabs 116 are separated from the receiving detents 126, and can pass by them while being rotated, until the user-applied force is removed and the tabs then re-engage another receptive detent 126, accordingly, securing the inner dial and the outer ring in place, and thus the dosage reminder indicator 114 pointing at a desired dosage timing indicator 122.

Notably, the engaging members (raised tabs 116 and receptive detents 126) may be any suitable number (e.g., seven tabs as shown for seven days a week, fourteen detents for AM/PM consideration, notably where the 14 tabs can be used for 7 detents or 14 detents, accordingly). That is, the number of opposing engaging members need not be the same, and the illustrative example shown is merely one example. For instance, though the number of engaging members may each match the number of securable positions of the rotating dial 110 (and thus the number of dosage reminder indicator positions that may be achieved and locked in place), therefore allowing a secure selection of a particular last/next dosage time (e.g., seven for seven days a week, fourteen for AM/PM days of a week, etc.), other embodiments allow for more positions without detracting from the ability to select adequate positions (i.e., more positions than dosage times, such as fourteen positions for only seven days a week (e.g., either of two selectable positions still correspond to the dosage reminder indicator pointing to the same day).

Figure 4A:
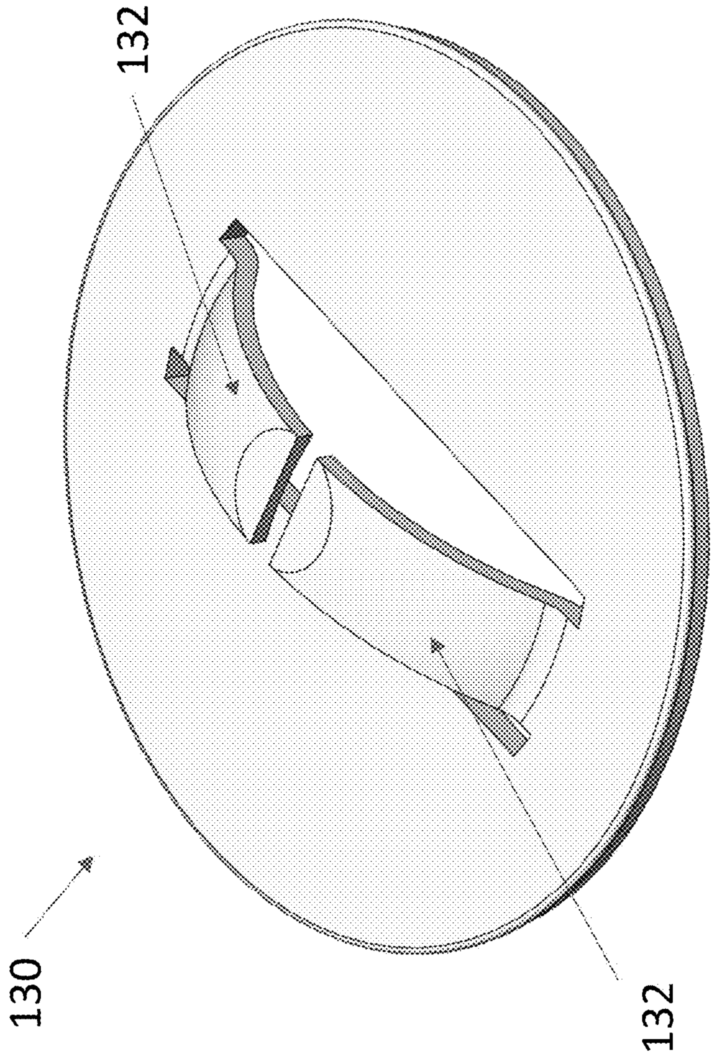
FIGS. 4A-4E illustrate an example spring mechanism/base plate of a dosage reminder indicator apparatus for containers according to one or more embodiments of the present disclosure.

FIGS. 4A-4E illustrate an example spring mechanism/base plate 130 of a dosage reminder indicator apparatus 100 for containers according to one or more embodiments of the present disclosure. In particular, FIG. 4A illustrates a top perspective view of an illustrative spring mechanism/base plate 130 of a dosage reminder indicator apparatus 100. Specifically, the illustrative base plate 130 may comprise one or more spring mechanisms 132, such as leaf springs as shown, that may either be added onto the base plate 130, or made from the base plate (e.g., cut and bent to shape, 3D printed, etc.). The spring mechanisms 132 may contact the underside of the inner dial 110, allowing sufficient pressure to keep the inner dial engaged with the outer ring 120 at all times, but is secured in position (when opposing engaging members are interlocked) unless the spring 132 is compressed by user-applied force.

Figure 4C:
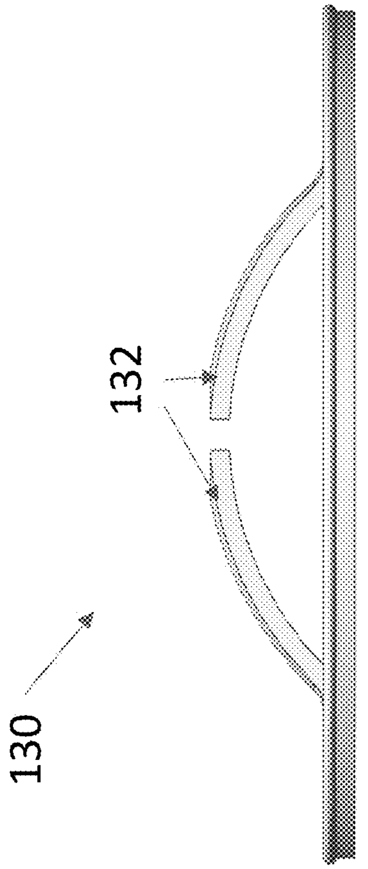
Figure 4B:
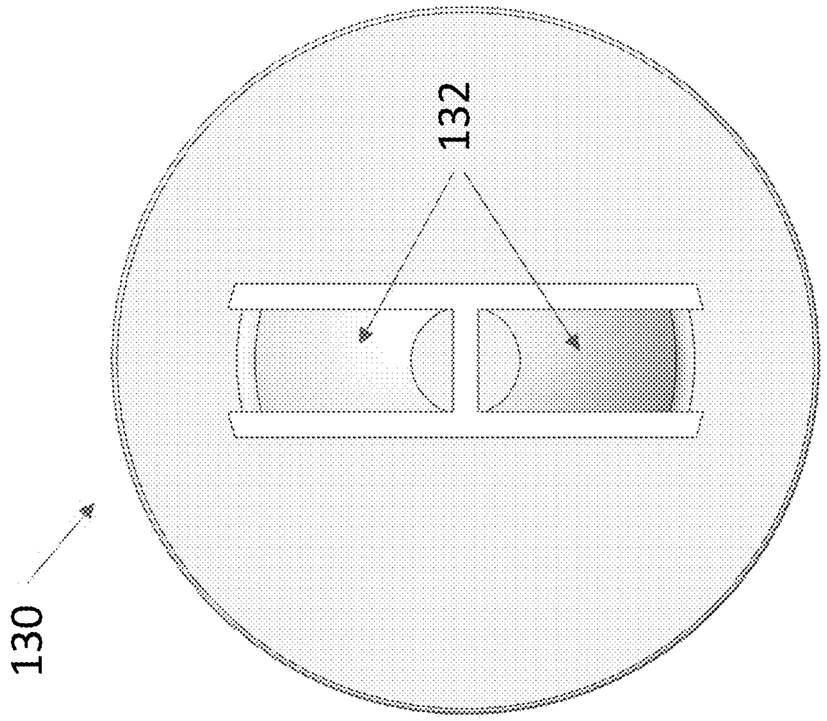

Notably:

FIG. 4B illustrates a top view of an illustrative spring mechanism/base plate 130 of a dosage reminder indicator apparatus 100.

FIG. 4C illustrates a side view of an illustrative spring mechanism/base plate 130 of a dosage reminder indicator apparatus 100.

Figure 4E:
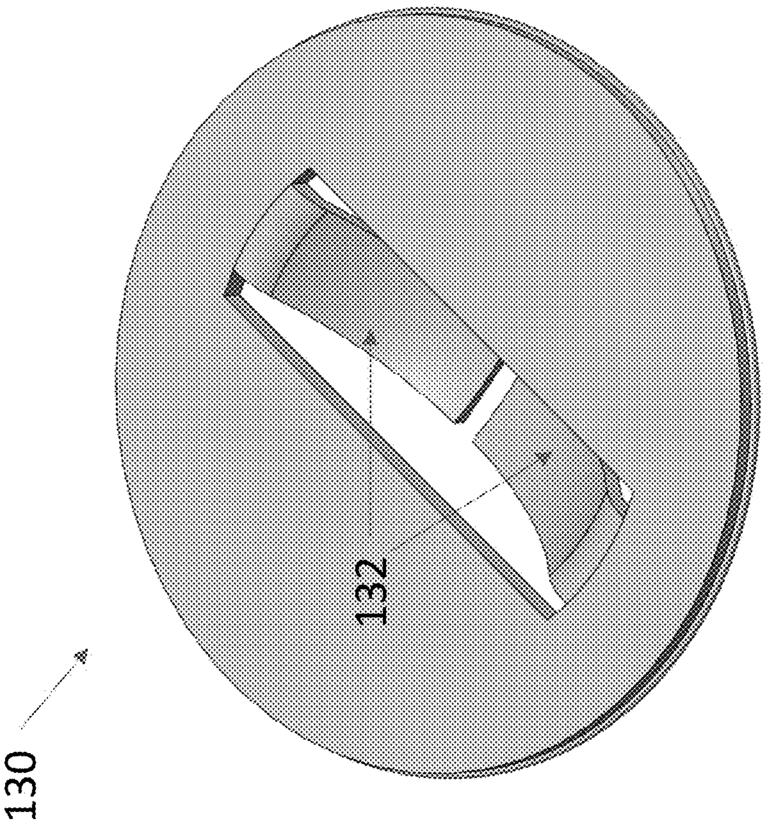
Figure 4D:
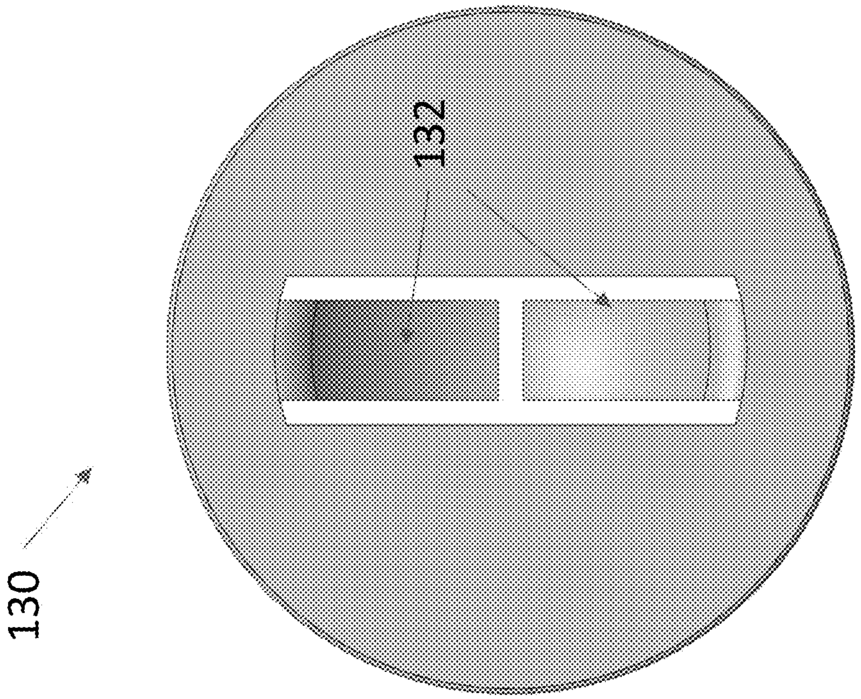

FIG. 4D illustrates a bottom view of an illustrative spring mechanism/base plate 130 of a dosage reminder indicator apparatus 100.

FIG. 4E illustrates a bottom perspective view of an illustrative spring mechanism/base plate 130 of a dosage reminder indicator apparatus 100.

The engaging members and may be sized and shaped accordingly to correspondingly engage with each other, and to secure the rotation at a particular location in a manner that prevents inadvertent moving of the dial (or ring). That is, the spring mechanism 132 should supply sufficient force to prevent disengagement of the engaging members without purposeful user-applied force.

Figure 5:
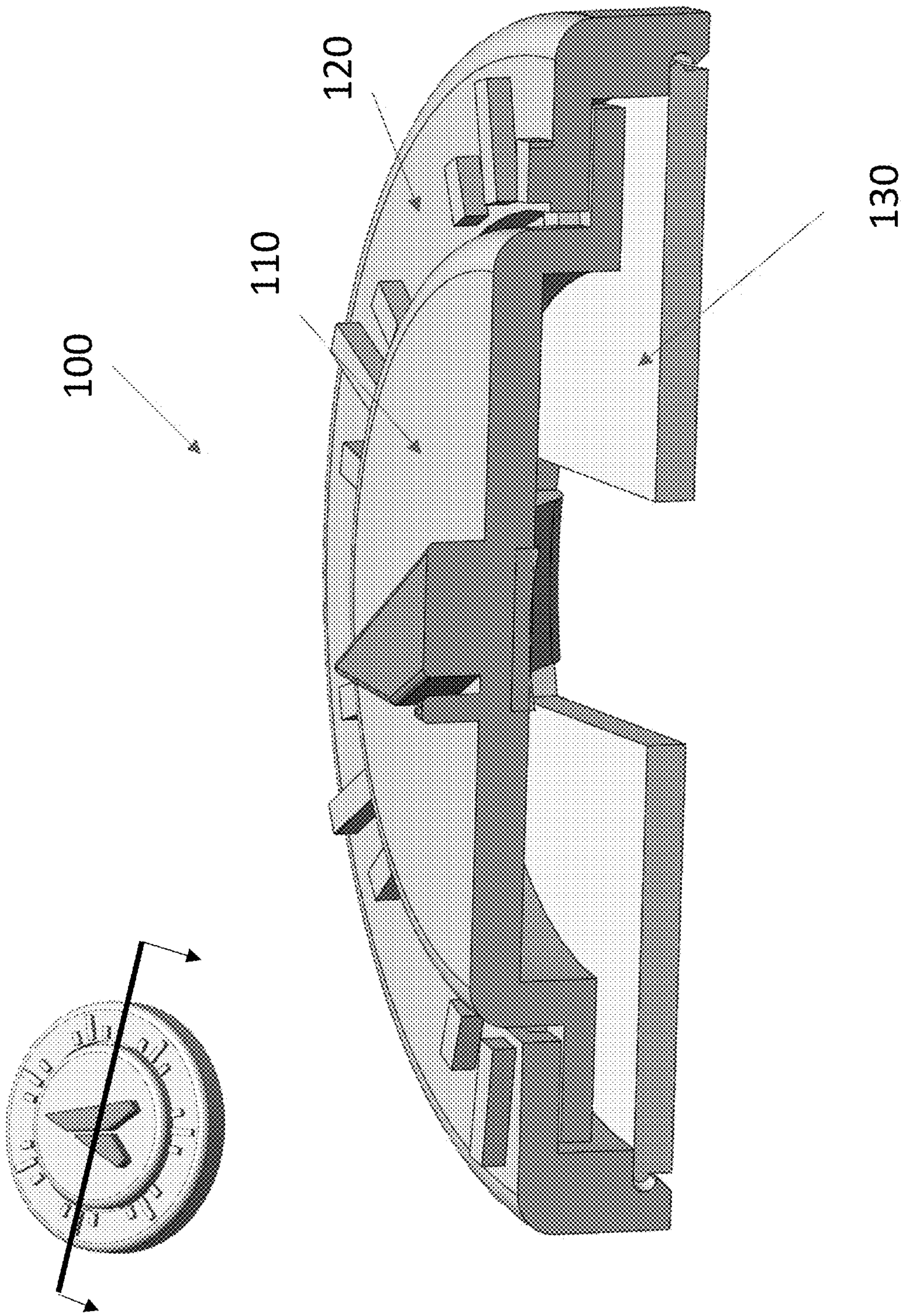
FIG. 5 illustrates an example cutaway view of a dosage reminder indicator apparatus for containers according to one or more embodiments of the present disclosure.

FIG. 5 illustrates an example cutaway view of a dosage reminder indicator apparatus 100 for containers according to one or more embodiments of the present disclosure, particularly illustrating the components described above.

Figure 6B:
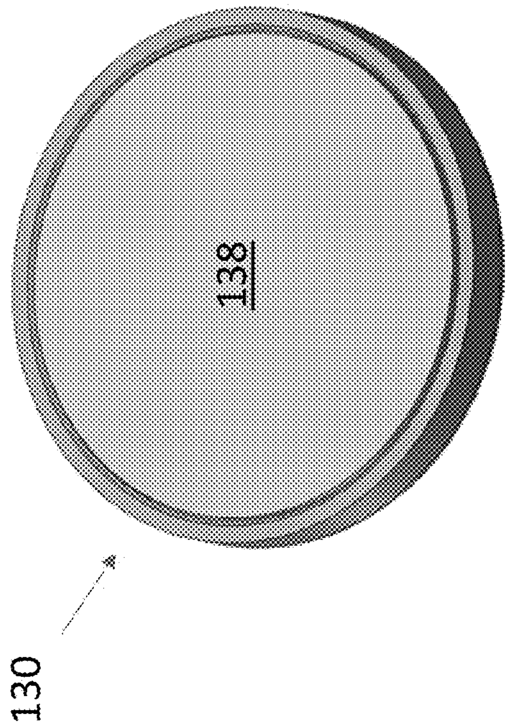
FIGS. 6A-6C illustrate examples of fastening mechanisms according to one or more embodiments of the present disclosure.
Figure 6A:
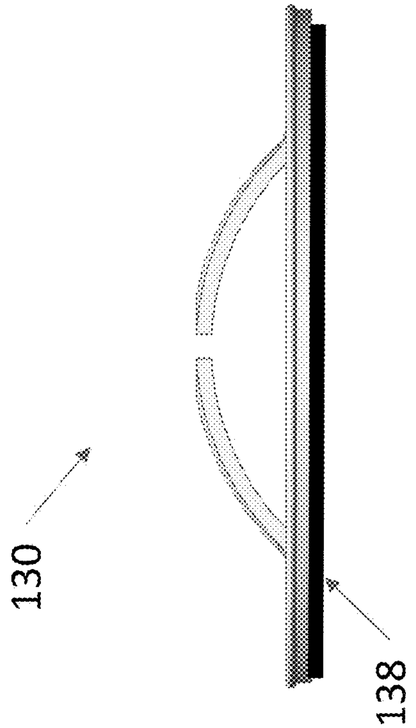
Figure 6C:
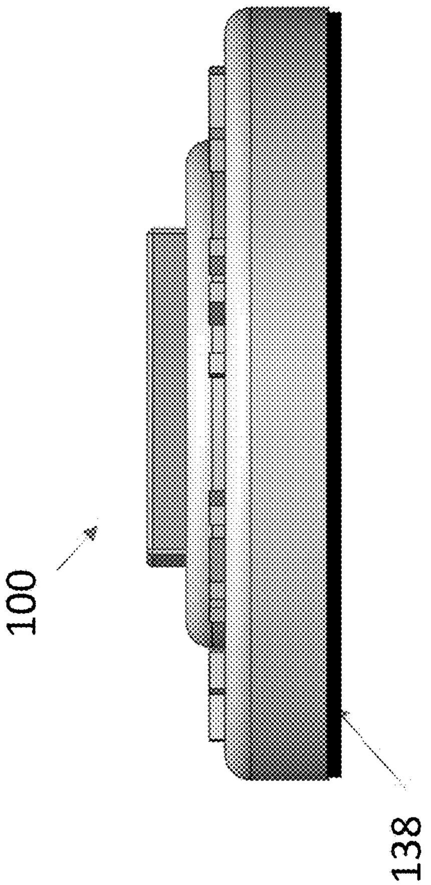

FIGS. 6A-6C illustrate examples of fastening mechanisms 138 according to one or more embodiments of the present disclosure. In particular, embodiments herein are also provided for situations where the dosage reminder indicator apparatus 100 is configured as an add-on to an existing container lid/cap. For instance, since there are many different sizes and closures of containers, the techniques herein further provide for embodiments that allow the dosage reminder indicator apparatus 100 to be added to an existing cap through the use of a fastening mechanism 138, such as adhesives, glues, stick-pads, double-sided tapes, hook-and-loop fasteners (e.g., VELCRO®), suction cups, and so on, that would secure dosage reminder indicator apparatus 100 to an original container lid, whether as a one-time usage or as a removeable and reusable configuration. In particular, FIGS. 6A-6B illustrate a side view and bottom perspective view (respectively) on how the fastening mechanism 138 may adhere to the base plate 130. FIG. 6C illustrates the entire dosage reminder indicator apparatus 100 from the side with such a fastening mechanism 138.

FIGS. 7A-7D illustrate examples of positioning of the dosage reminder indicator apparatus 100 on containers 200 according to one or more embodiments of the present disclosure. Generally, the container 200 may be any suitable container for storing a consumable good, particularly ones that have a dosage (prescribed, recommended, preferred, etc.). For example, illustrative containers 200 may comprise bottles, jars, dispensers, jugs, cups, or other containers (including, in certain embodiments, boxes, bags, etc.). Container lids (caps) 230 may therefore also be considered to be a cap, top, cover, etc. for such containers, accordingly. The consumable goods within the container 200 may comprise anything suitable for a dosage, such as medications, drugs, supplements, vitamins, pharmaceuticals, nutraceuticals, and so on, and may take the form of pills, tablets, capsules, soft-gels, chewables (e.g., "gummies"), powders, or liquids, as noted above.

Figure 7A:
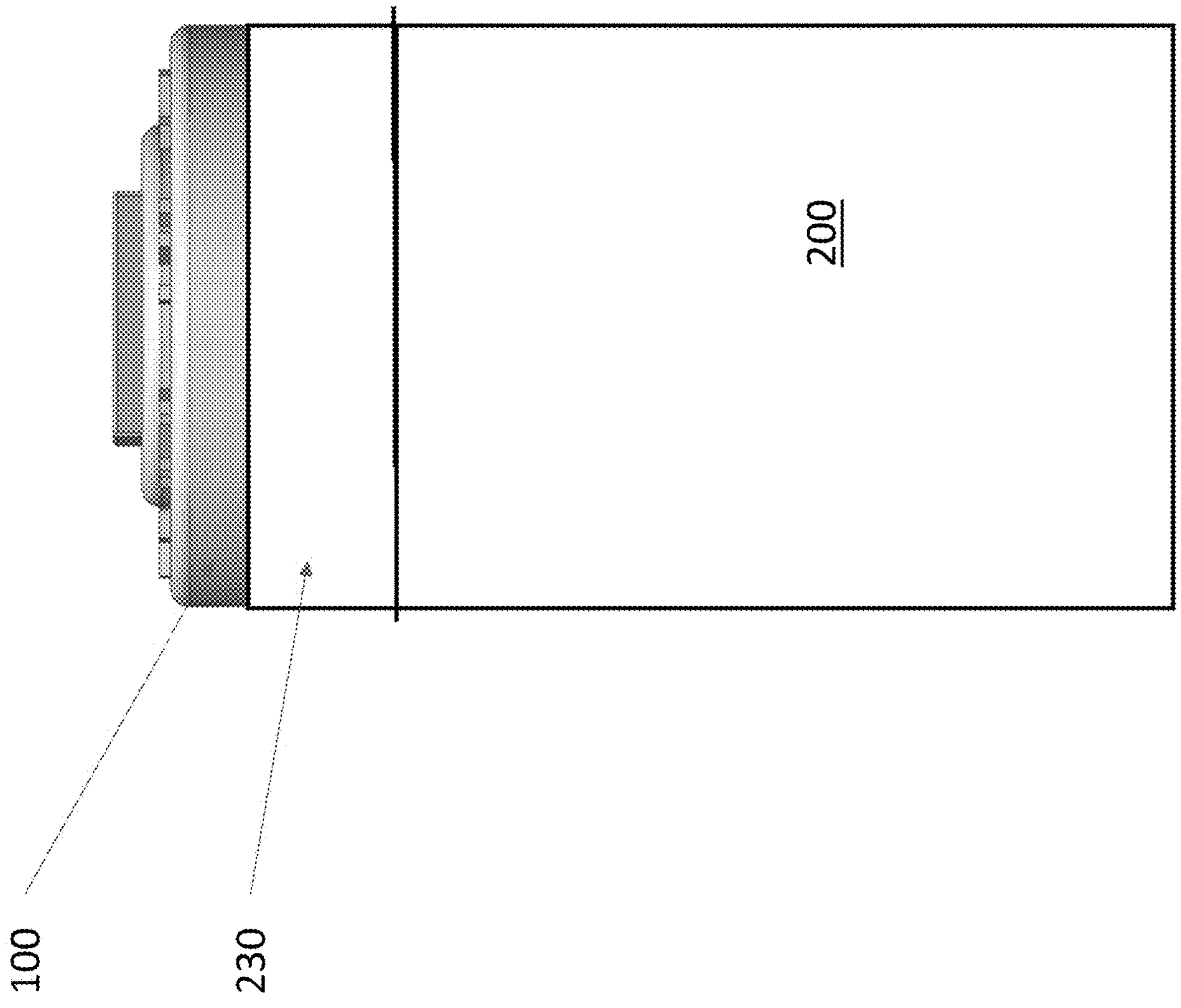
FIGS. 7A-7D illustrate examples of positioning of the dosage reminder indicator apparatus on containers according to one or more embodiments of the present disclosure.
Figure 7B:
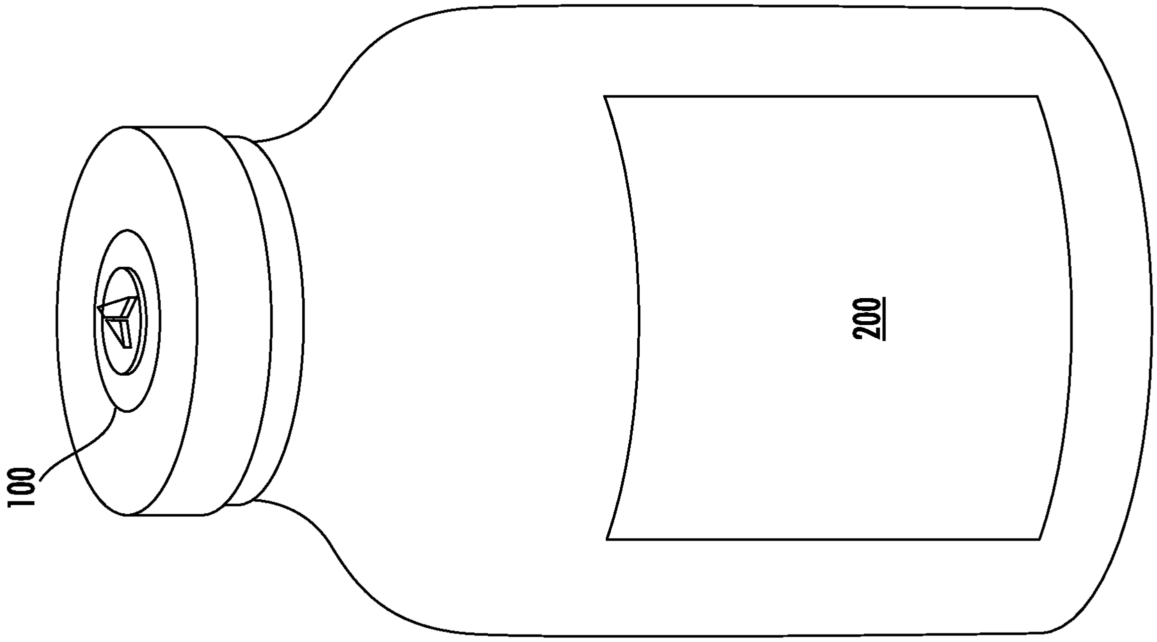
Figure 7C:
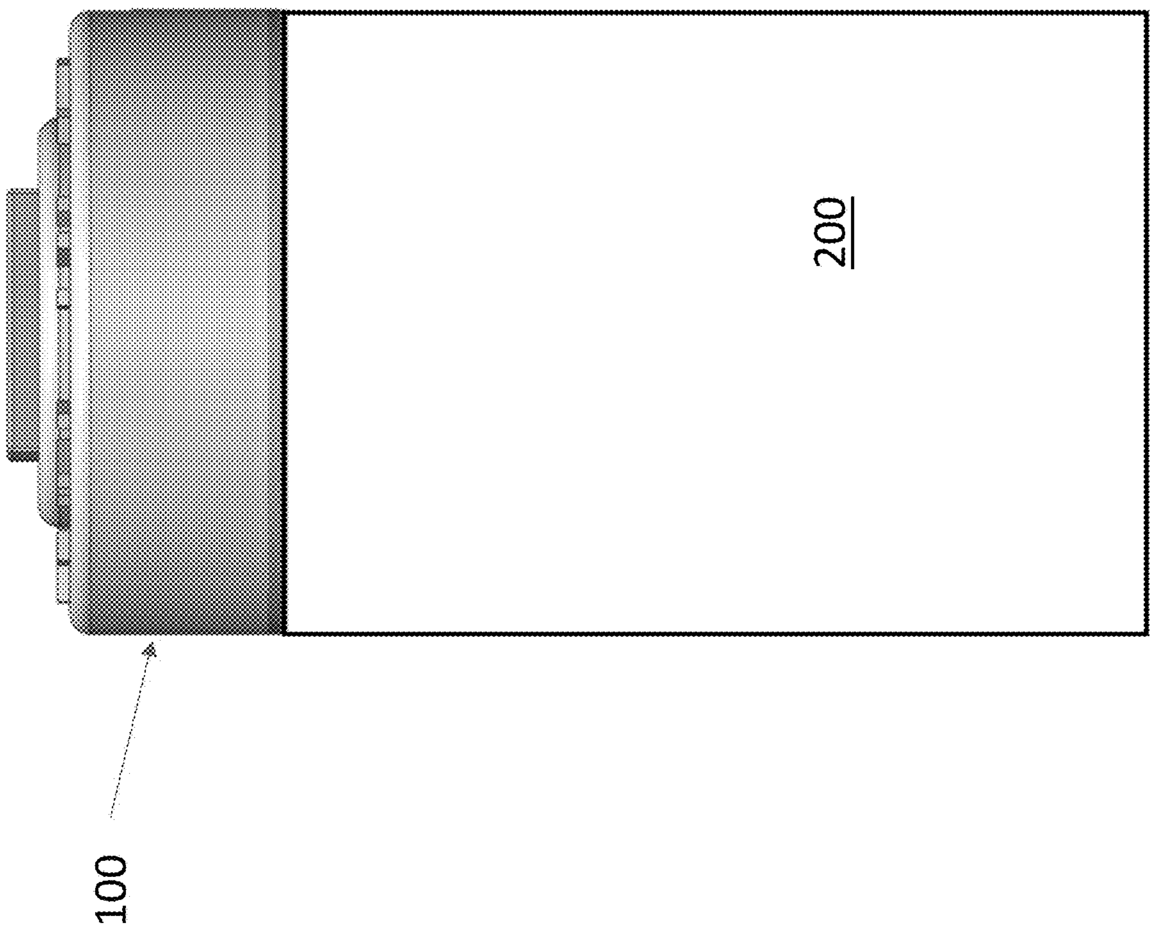
Figure 7D:
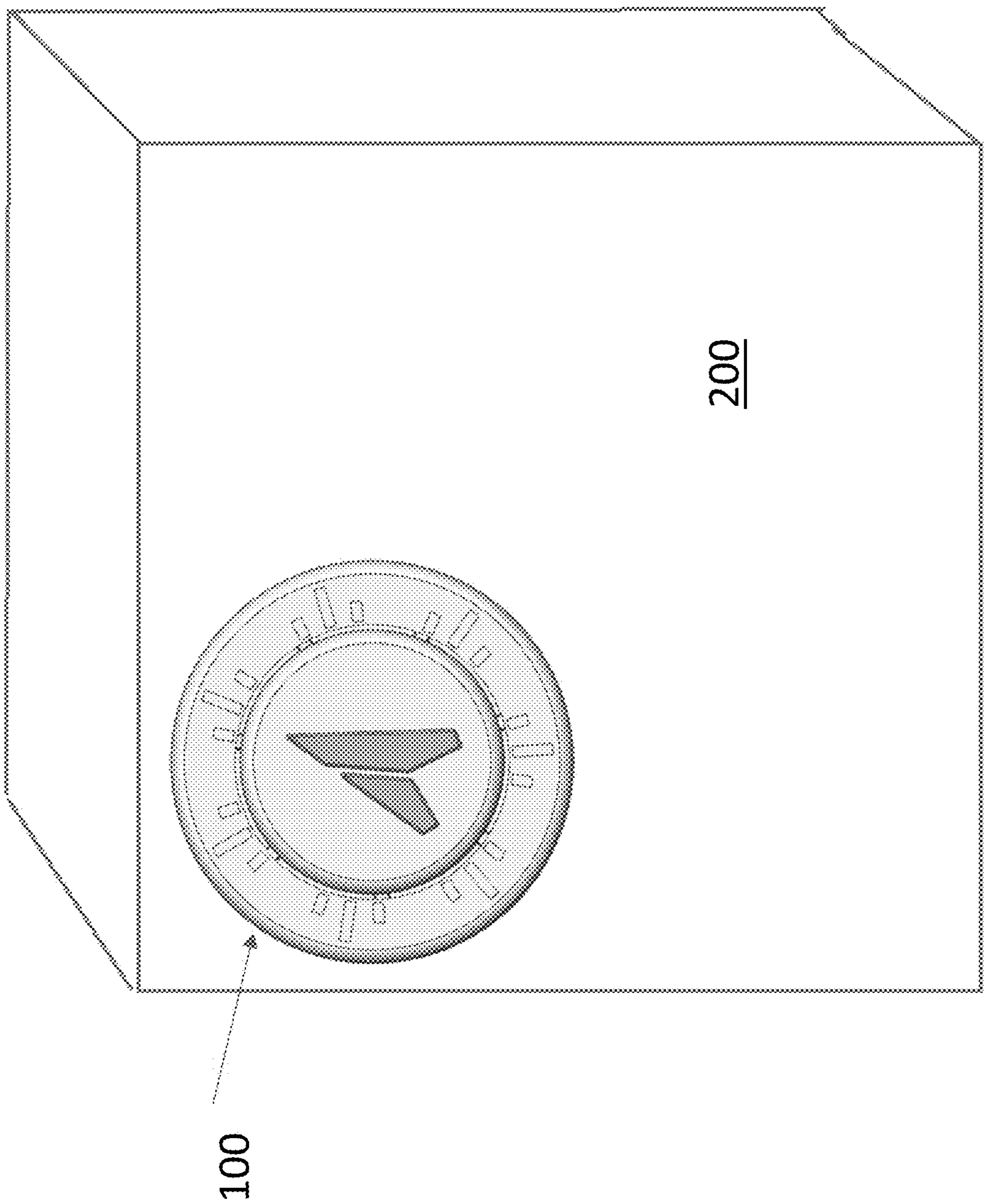

Specifically, FIG. 7A illustrates an embodiment where the dosage reminder indicator apparatus 100 affixes to a similarly sized lid/cap 230 for a container 200. FIG. 7B illustrates an embodiment where the dosage reminder indicator apparatus 100 affixes to a larger sized lid/cap 230 for a container 200. FIG. 7C illustrates an embodiment where the dosage reminder indicator apparatus 100 is the actual lid/cap for the container 200. FIG. 7D illustrates the dosage reminder indicator apparatus 100 on a box container 200.

Figure 8B:
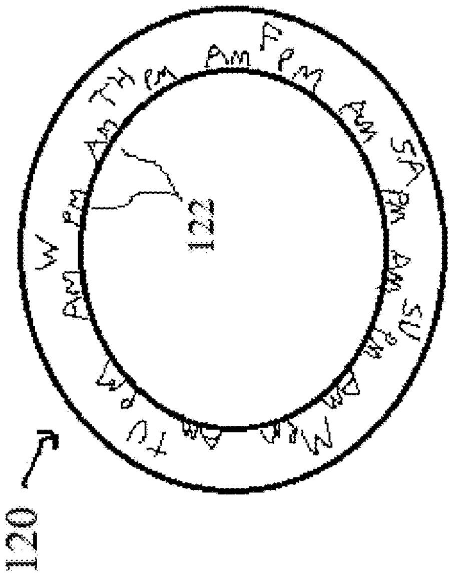
FIGS. 8A-8C illustrate examples of an alternative design for dosage timing on the outer ring according to one or more embodiments of the present disclosure.
Figure 8C:
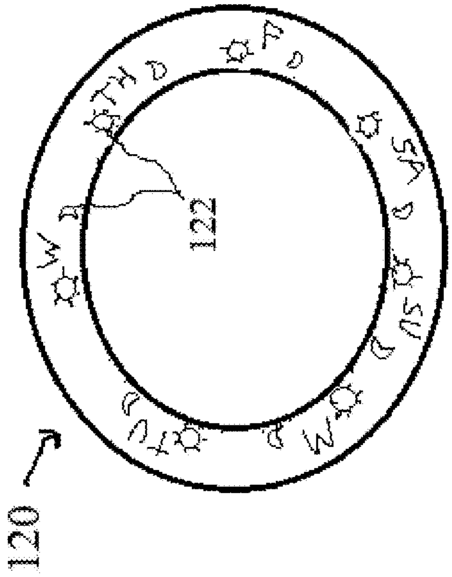
Figure 8A:
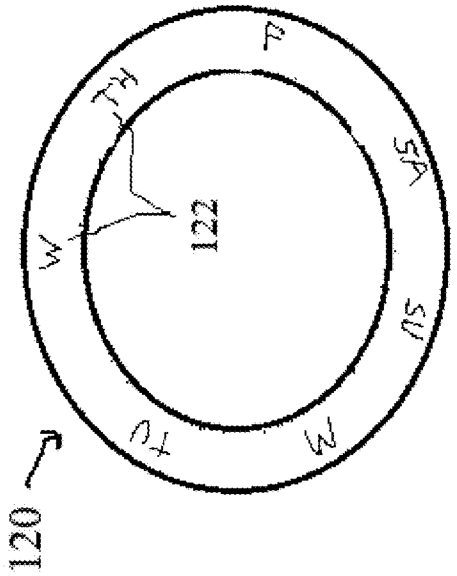

FIGS. 8A-8C illustrate examples of an alternative design for dosage timing indicators 122 on the outer ring 120 according to one or more embodiments of the present disclosure. For instance, the actual dosage timing indications 122 can be any desired indicator design, including raised or depressed lettering/numbering, painted-on or printed-on lettering/numbering, interchangeable sticker rings (e.g., with various optional dosage timings for when the cap is sold as a customizable add-on accessory), and so on. FIG. 8A, for instance, illustrates the seven days of the week as indicators 122. FIG. 8B, on the other hand, illustrates one example of an alternative design for dosage timing on the stationary ring 120, where the dosage timing indicators 122 are based on morning and night dosage ("AM" and "PM") for each day of the week, or other symbols such as suns and moons as in FIG. 8C. Many other suitable configurations are available, such as showing hours in a day (e.g., 24-hours, or 12 hours AM and 12 hours PM), days in a month (e.g., 31-day markings, such as for medication to be taken once every so many days), 12 months of the year (e.g., for once-monthly medications, such as for pets, birth control, etc.), 3-hr/4-hr/6-hr/8-hr/12-hr dosage timings, and so on. Different rings 120 may also be configured for different languages, abbreviations versus full words, shapes or designs (e.g., red/green alternating shapes for every other day pills, etc.), and any other configurable desired dosage timing indications.

Figure 9B:
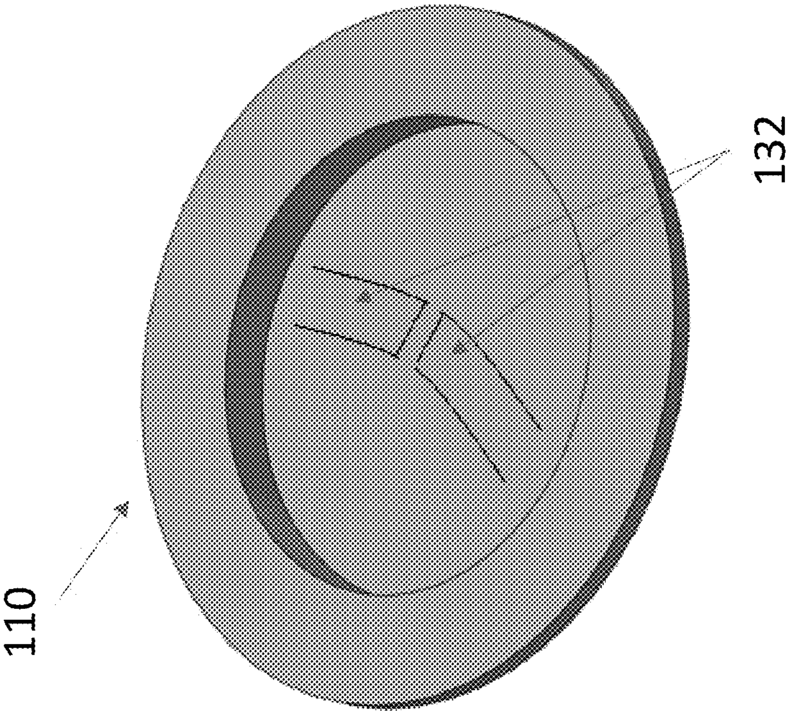
FIGS. 9A-9B illustrate examples of an alternative designs for spring mechanisms according to one or more embodiments of the present disclosure.
Figure 9A:
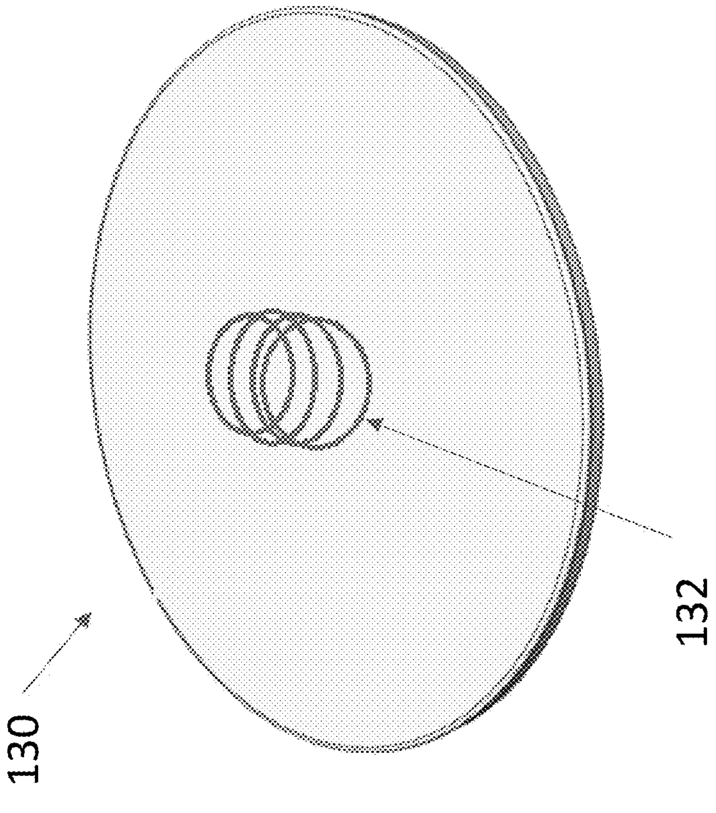

FIGS. 9A-9B illustrate examples of an alternative designs for spring mechanisms according to one or more embodiments of the present disclosure, specifically where FIG. 9A illustrates a base plate 130 with a coil spring 132, or where FIG. 9B illustrates the leaf springs 132 extending from the bottom of the inner dial 110. Many other designs of spring mechanisms are possible herein, including more or fewer springs, different spring designs, and so on, and those shown herein are not meant to be limiting to the present disclosure.

Figure 10A:
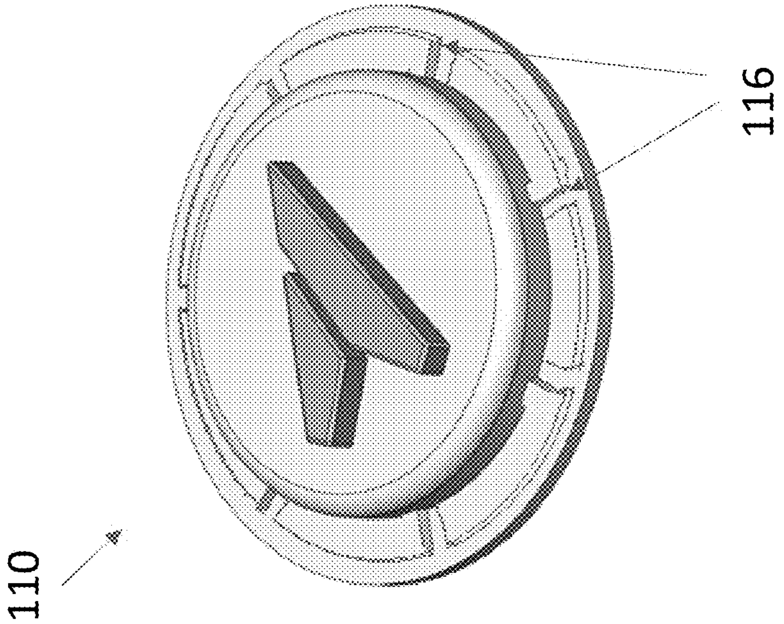
FIGS. 10A-10B illustrate examples of an alternative design for engaging members according to one or more embodiments of the present disclosure.
Figure 10B:
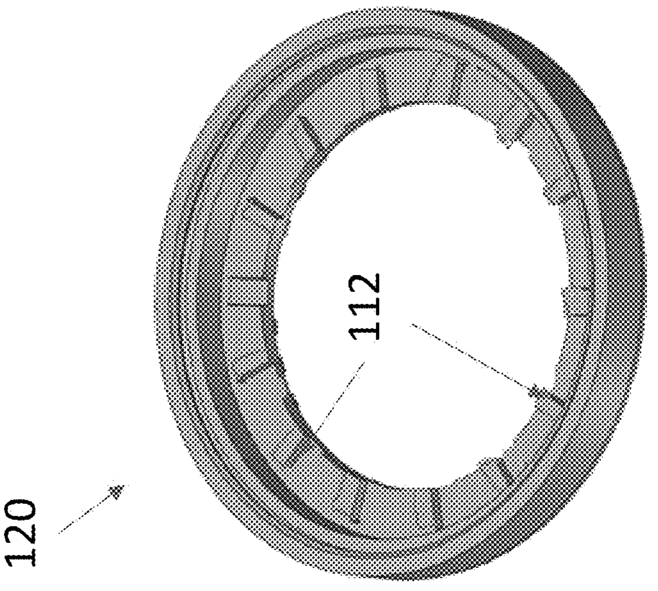

Further, FIGS. 10A-10B illustrate examples of an alternative design for engaging members according to one or more embodiments of the present disclosure. In particular, FIG. 10A shows an inner dial 110 with recessed/receiving detents 116, whereas in FIG. 10B the opposing outer ring 120 now has the protruding/raised tabs 112. Other alternatives may exist, and those shown herein are merely examples that are not meant to be limiting.

In addition, in accordance with an alternative embodiment of the present invention, and with reference generally to FIGS. 11-18D, an illustrative container lid 300 may have a rotating dial 310 and a stationary outer ring 320 that secures directly to the container 200. The rotating dial 310 may itself comprise a grip member 312, a next/last dosage reminder indicator 314, and a plurality of outwardly protruding members 316, which engage to allow positionally secured rotation of the rotating dial 310 within the outer ring 320. Outer ring 320, conversely, may comprise a plurality of dosage timing indicators 322, optional knurling 324 (or other gripping aid/design for easy open and secure close, such as ridges, bumps, rubber knobs, rubberization or comfort rubber grip, etc.), and a plurality of engaging members 326 configured to allow positionally secured rotation of the rotating dial by engaging the plurality of outwardly protruding members 316 of the rotating dial, as detailed herein. As also described below, the outer ring 320 may comprise a closure mechanism 328 to securely engage with a corresponding closure mechanism 228 of a container 200.

Figure 12A:
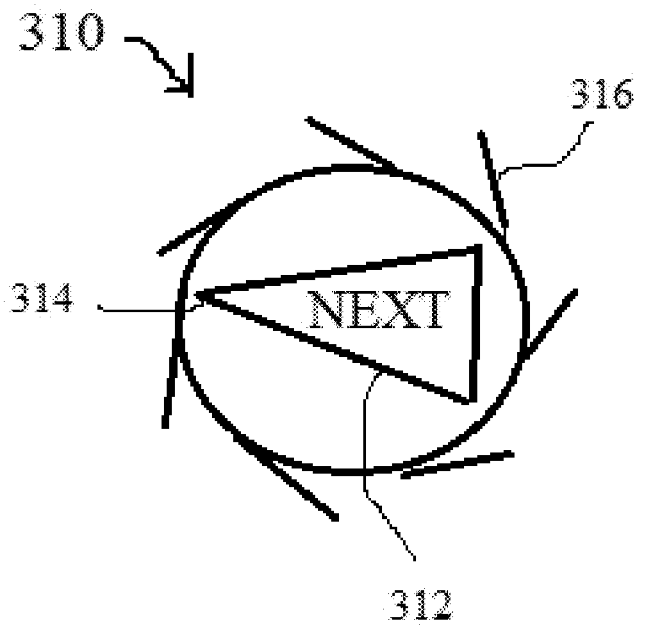
FIGS. 12A-12B illustrate an example of a separated rotating dial and stationary ring according to one or more embodiments of the present disclosure.
Figure 12B:
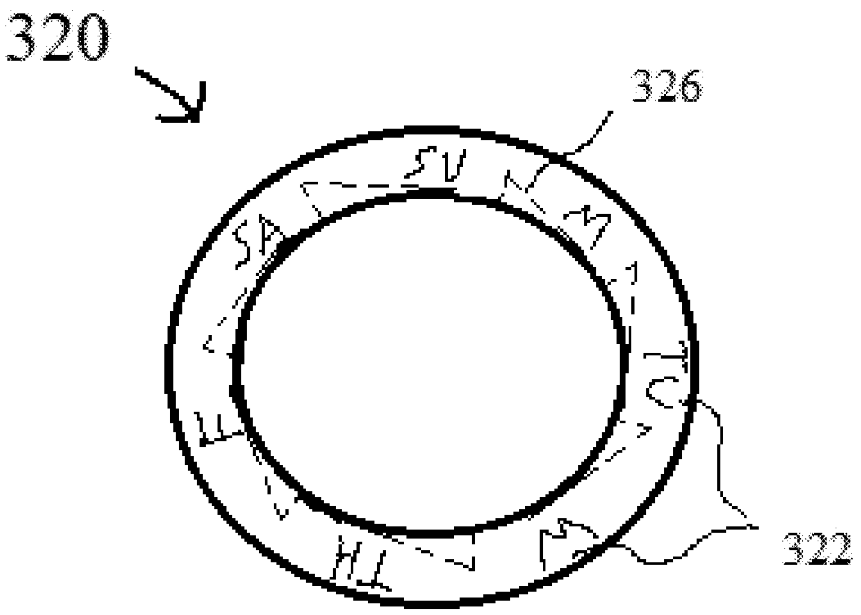

FIGS. 12A-12B illustrate an example of a separated rotating dial 310 and stationary ring 320 according to one or more embodiments of the present disclosure. As can be seen, the rotating dial 310 (FIG. 12A) may comprise a grip member 312 with optionally integrated next/last dosage reminder indicator 314 (as shown being a "LAST" indicator), and the stationary ring 320 comprises the dosage timing indicators 322, each as mentioned above. However, as visible in the exploded view, a plurality of protruding members 316 are shown on the rotating dial 310 in FIG. 12A, and a plurality of corresponding recessed engaging members 326 are shown within the stationary ring 320 in FIG. 12B.

As mentioned above, the configuration of the protruding members 316 and receiving engaging members 326 allow for positionally secured rotation of the rotating dial 310 within the outer ring 320. That is, the embodiments herein provide for the dial 310 to be "clickable" in a rotating manner (e.g., in any direction, or unidirectional, like a ratchet, as shown) through user-applied force, where the illustrative flexible protruding members 316 act as cantilevered linear flex springs that bend past engaging members 326 during rotation of the dial 310 until engaging into engaging members 326 as points of secured engagement. As shown, by extending in a tangential manner, the protruding members 316 may provide unidirectional rotation with the angled engaging members 326 similar to ratchet pawls against a toothed ratchet ring, where the protruding members bend/flex in only one direction, and corresponding engage the members 326 to prevent reverse rotation.

Figure 13A:
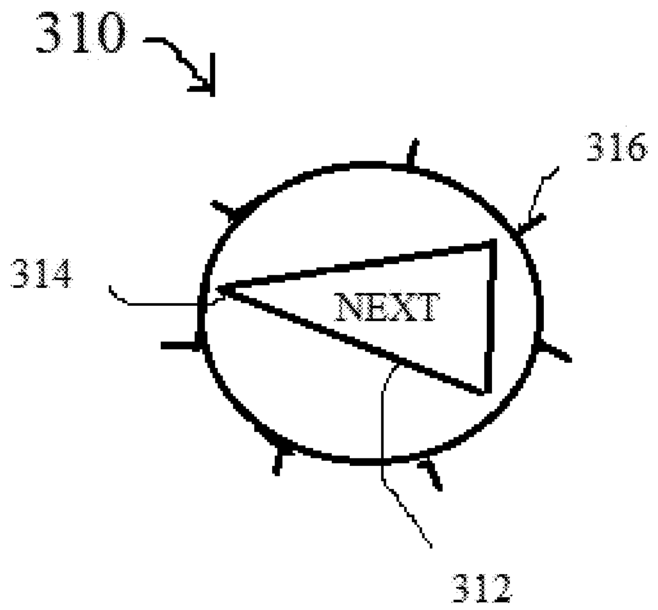
FIGS. 13A-13B illustrate another example of a separated rotating dial and stationary ring according to one or more embodiments of the present disclosure.
Figure 13B:
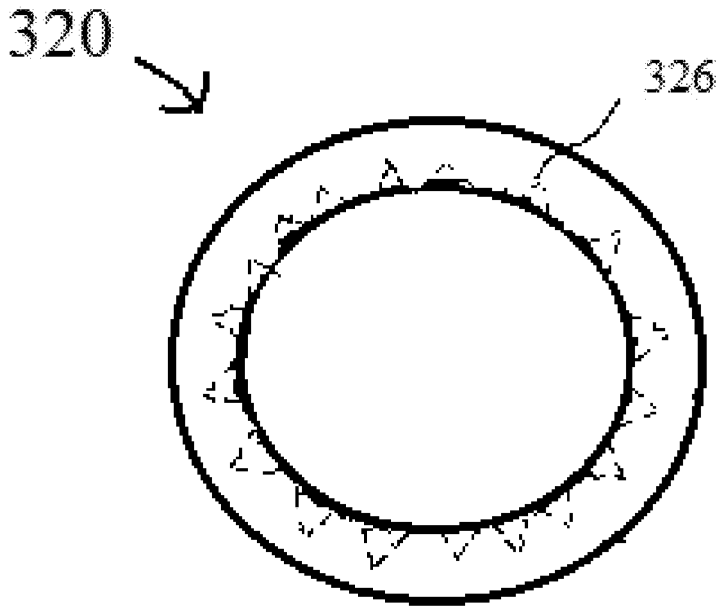

Alternatively, as shown in FIGS. 13A-13B, the protruding members 316 may extend radially from the rotating dial (FIG. 13A), and the engaging members 316 may be non-directional detents (FIG. 13B, with dosage timing indicators 322 removed for clarity), where sufficient torque of the rotating dial in either direction would allow bi-directional movement of the dial 310, and thus the indicator 314, into a plurality of secured positions.

As mentioned above, the protruding members 316 may be any suitable number (e.g., seven as shown for seven days a week, fourteen for AM/PM consideration, 31 for days of the month, 24 for hours in a day, and so on), and may be sized and shaped accordingly to correspondingly engage with the plurality of inwardly formed engaging members 326 of the stationary ring 320 (FIG. 12B), and to secure the rotating dial 310 within the stationary ring 320 (e.g., allowing one-way insertion of the rotating dial 310 into the receiving aperture of the stationary ring 320 through flexibility of the protruding members 316), to prevent disengagement and also to prevent looseness of the dial 310 within the stationary ring 320 during rotation.

Additionally, the number of protruding members 316 and engaging members 326 need not be the same, and the illustrative example shown (seven each) is merely one example. For instance, though preferably the number of engaging members 326 matches the number of securable positions of the rotating dial 310 (and thus the number of dosage reminder indicator positions that may be achieved and locked in place), therefore allowing a secure selection of a particular last/next dosage time (e.g., seven for seven days a week, fourteen for AM/PM days of a week, etc.), other embodiments allow for more positions without detracting from the ability to select adequate positions (i.e., more positions than dosage times, such as fourteen positions for only seven days a week (e.g., either of two selectable positions still correspond to the dosage reminder indicator 314 pointing to the same day), or even more for ease of turning the dial (e.g., a larger number of selectable positions would allow the next/last dosage reminder indicator 314 to point within the range of a particular dosage timing indicator 322). The number of protruding members 316, on the other hand, may also be adjusted in a similar manner, so long generally as the rotating ring 310 remains securely placed within the stationary ring 320, and allows for selectable rotation to the desired dosage indication positions (e.g., any number from two members up to the number of engaging members 326 or more).

Again, as mentioned above, the actual dosage timing indications 322 can be any desired indicator design, including raised or depressed lettering/numbering, painted-on or printed-on lettering/numbering, interchangeable sticker rings (e.g., with various optional dosage timings for when the cap is sold as a customizable add-on accessory), and so on, as well as any actual timings, etc., as detailed above in FIGS. 8A-8C.

Figure 11:
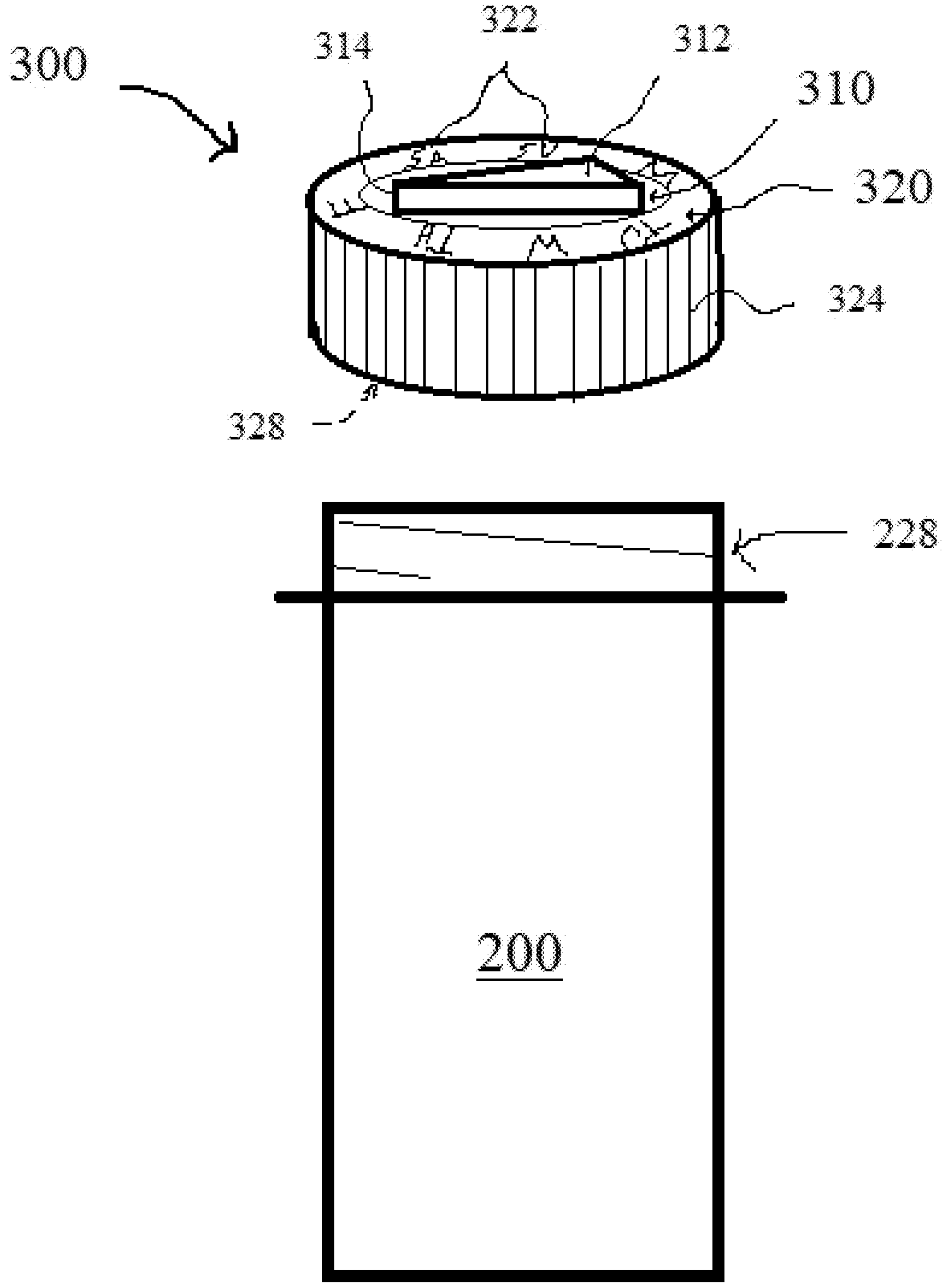
FIG. 11 illustrates an example of a container lid with dosage reminder indicator according to one or more embodiments of the present disclosure.
Figure 14A:
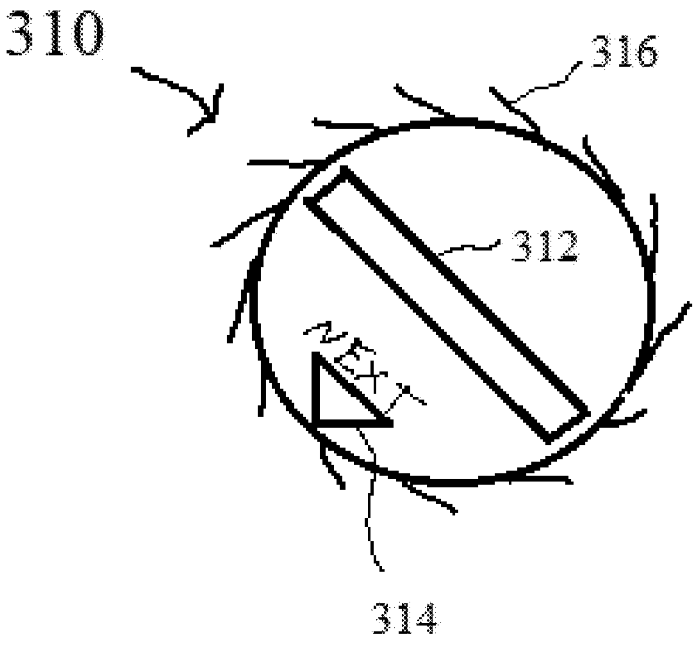
FIGS. 14A-14B illustrate an example of an alternative rotating dial grip member, dosage reminder indicator, and protruding members according to one or more embodiments of the present disclosure.
Figure 14B:
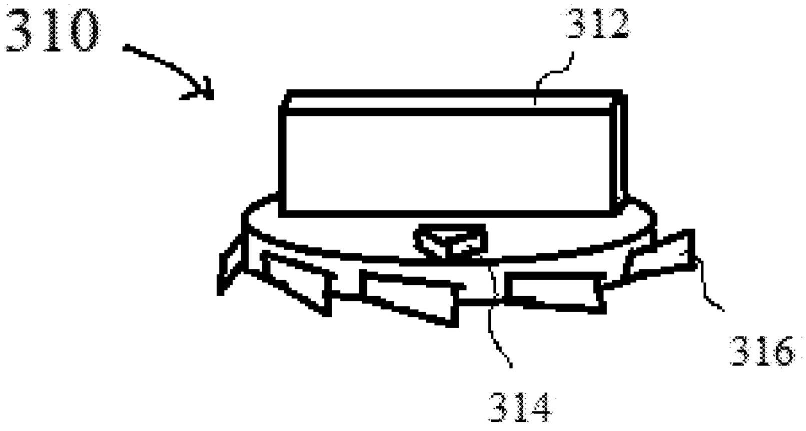

Also, the grip member 312 can be any suitable shape and height based on design, and not merely the triangular shape illustrated in the figures above. For instance, the shape may be more or less ergonomic, may be more or less protrusive for levels of grip (e.g., more protruding for better grip, such as for the elderly or arthritic users, or else less protruding to avoid interference with opening/closing the lid), and so on. In addition, the grip member 312 need not include the dosage reminder indicator 314 as it is shown in FIGS. 11, 12A, and 13A (e.g., the tip of the triangle), but may be separate from the grip member as a standalone component of the rotating dial 310. For example, as shown in FIGS. 14A-14B, an alternative rotating dial 310 and grip member 312 is shown (e.g., a more protruding rectangular grip member), where the separate dosage reminder indicator 314 is not integrated with the grip member 312. (Note also that FIGS. 14A-14B illustrate additional rotating dial protruding members 316, e.g., fourteen, such as for daily AM/PM secured positional rotation, as mentioned above.) Other shapes of the grip member 312, such as curves (concave or convex), stars, knobs, "coin-slots" (e.g., generally linear depressions that can only be turned with an inserted object, such as a coin), and so on, may also be used according to the embodiments herein, and those shown in the figures are merely illustrative examples.

Figure 15A:
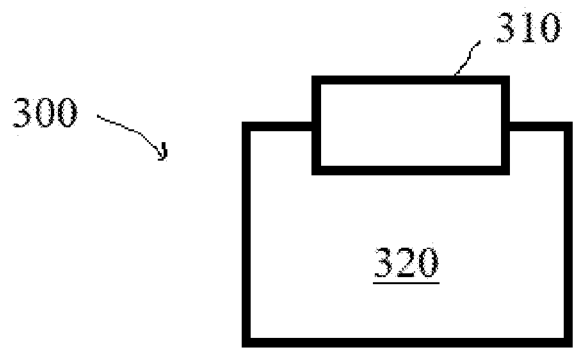
FIGS. 15A-15C illustrate examples of the grip member of the rotating dial being above, below, and flush with the stationary ring according to one or more embodiments of the present disclosure.
Figure 15B:
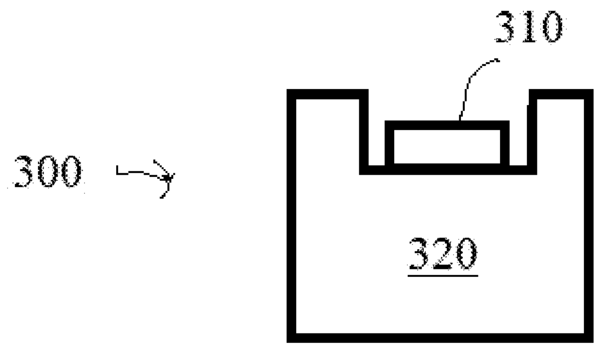
Figure 15C:
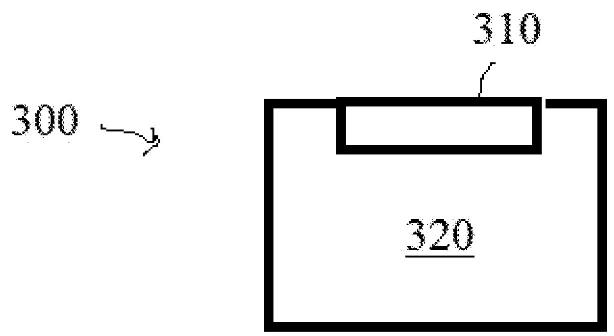

The actual height of the grip member 312 may also be configured in a number of ways, in order to provide various levels of gripping versus accidental turning when opening/closing the cap 300. For example, as shown in FIGS. 15A-15C, example simplified illustrations show how the grip member of the rotating dial 310 can be above (FIG. 15A), below (FIG. 15B), and flush with (FIG. 15C) the stationary ring 320 according to various embodiments of the present disclosure. For instance, being above the stationary ring allows for ease of access, but may result in inadvertent turning of the rotating dial. Being below the stationary ring (recessed) may help to avoid accidental turning, but may be more difficult to turn. Being parallel/flush to the top of the ring, the dial's grip member may be both easier to turn, and less likely to be in the way of opening/closing the cap. The ultimate design may be decided on a per-configuration basis, and each embodiment is fully contemplated herein in order to allowing a balance of their perceived benefits and disadvantages.

The closure mechanisms 328 of the lid 300 can be configured as any suitable mechanism to mate with the corresponding closure mechanism 228 of the container 200. For instance, as will be appreciated by those skilled in the art, closures 328/228 may comprise screw threads, standard threads, quick threads, coarse threads, fine threads, snap seals, pop-tops, press seals, various childproof mechanisms (e.g., push-to-engage, push-to-turn/open, etc.), and so on. Generally, the present disclosure provides for lid 300 that has a stationary outer ring 320 that remains stationary when closed on the container regardless of the closure mechanisms used, while the rotating dial 310 rotates in relation to the stationary outer ring (in the closed position, or while removed and separate from the container 200), accordingly. Notably, while many of the figures herein illustrate an example closure mechanism that is a screw-on (threaded) closure mechanism of both the lid 300 and the container 200, many other options may be configured, and those shown are not meant to limit the scope of the present disclosure.

Figure 16A:
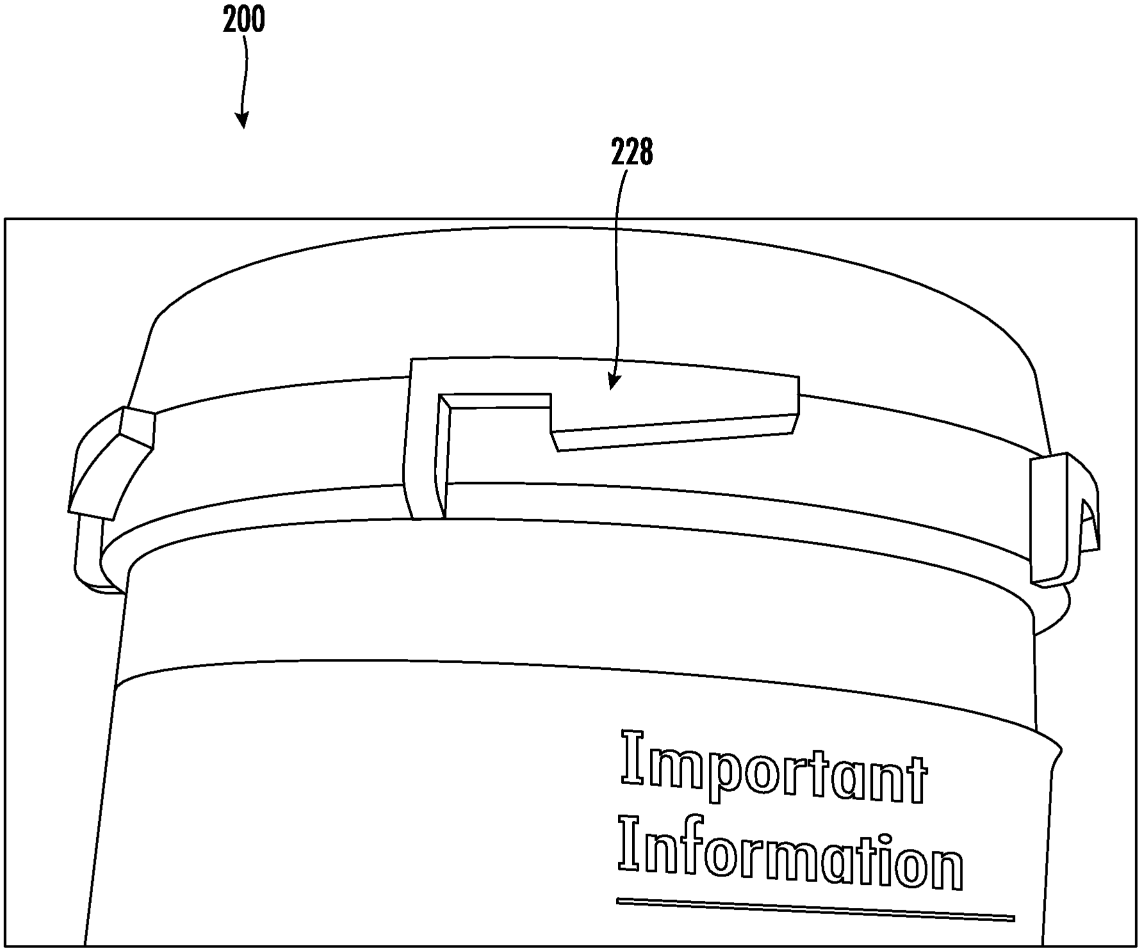
FIGS. 16A-16B illustrate an example of a push-to-open pill cap and corresponding closure mechanism according to one or more embodiments of the present disclosure.
Figure 16B:
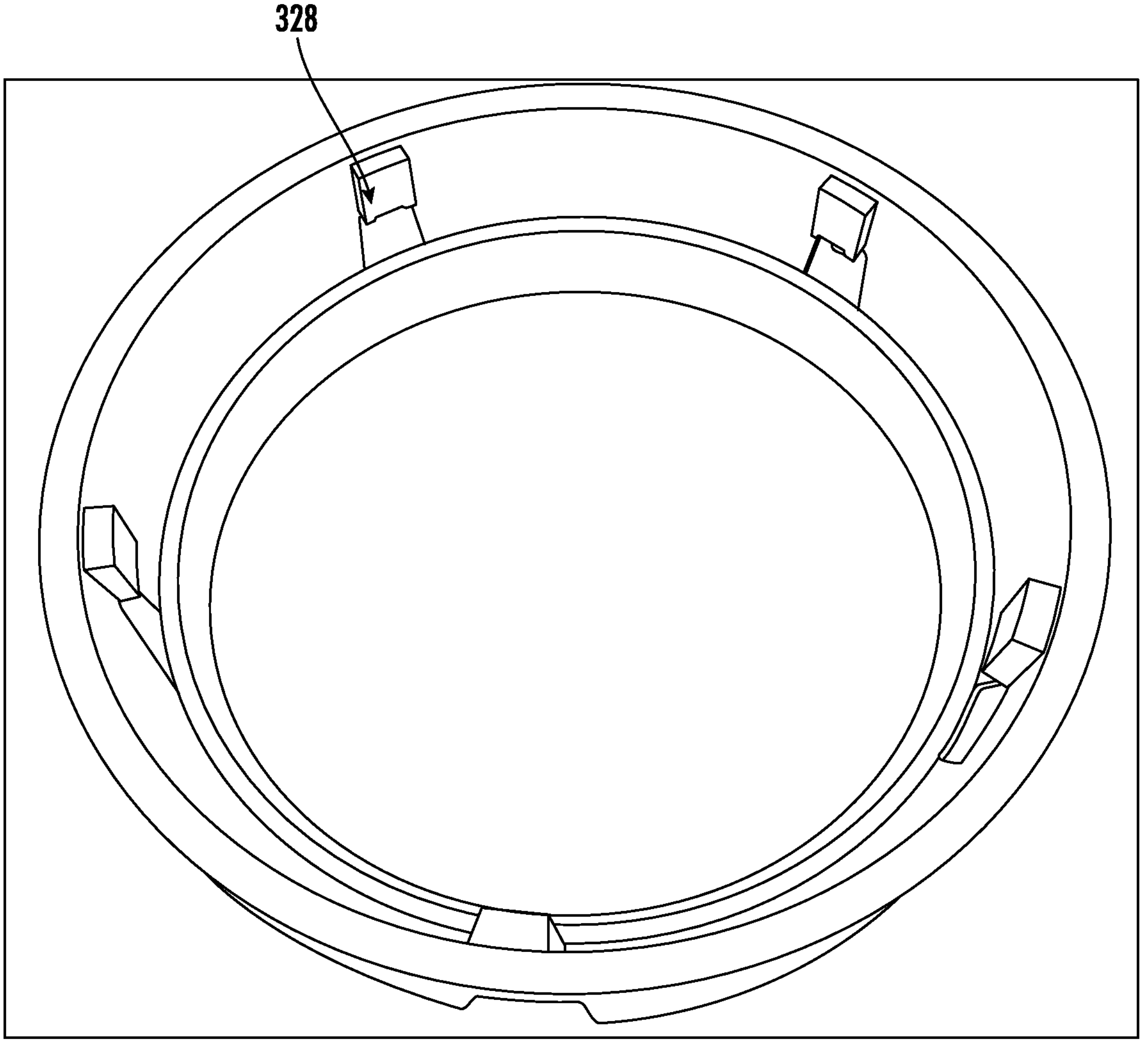

As an example, FIGS. 16A-16B illustrate an example of a push-to-open pill container 200 (FIG. 16A) and corresponding closure mechanism 328 (FIG. 16B) for a cap 300 that may be configured according to one or more embodiments of the present disclosure (e.g., as opposed to the illustrated screw-closure mechanism illustrated in the figures above). Again, many other closure mechanisms are conceived herein, and those shown are merely illustrative examples.

Figure 17:
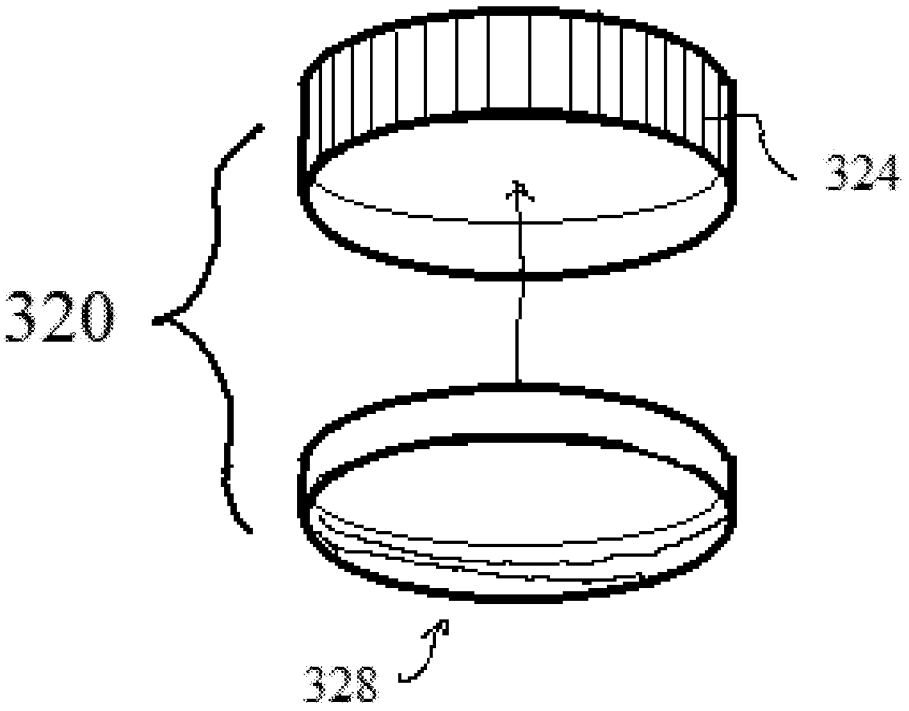
FIG. 17 illustrates an example of a modular closure mechanism according to one or more embodiments of the present disclosure.

Although the container lid design herein can be manufactured to desired specifications for size, dosage, closure types, etc., the embodiments herein may also be configured as a modular design, for both manufacturing ease and for consumer customization. For instance, the rotating dial 310, outer ring 320, and closure mechanism 328 may each be separate components that can be interchanged, whether in a single "click together" configuration of a user's (or manufacturer's) choice, or else in a removable and repeatedly configurable manner. For example, different closure mechanisms may be used on different bottles, but the outer ring and dial may remain the same. For instance, as shown in FIG. 17, a modular closure mechanism 328 is shown being able to be selected to match the desired closure mechanism 228 of the container, and then inserted into the stationary ring 320 (which may be secured through press-fitting, compression, "clicking" in place, various adhesives, one-way threading, and so on).

Alternatively, for modular designs, the rotating dial 310 may remain the same, but the size of the outer ring 320 may be interchanged to account for different sizes of container openings and/or to account for different prescribed/recommended/preferred dosage schedules or different languages, without thus having to manufacture all new rotating dials and closure mechanisms to account for the different configurations. Many other configurations may be conceived in accordance with the modularity herein (e.g., childproof versus easy-open closures, seven days of week versus fourteen daily morning and evening schedules (AM/PM indications), larger grip members versus lower-profiled grip members, and so on), and those mentioned herein are merely meant to demonstrate the benefits of the modularity design herein without limiting the scope of the present disclosure. Modularity may also be achieved by the use of stickers, such as to allow for changing only the dosage timing indications without the need to change any physical components of the cap 300.

Figure 18A:
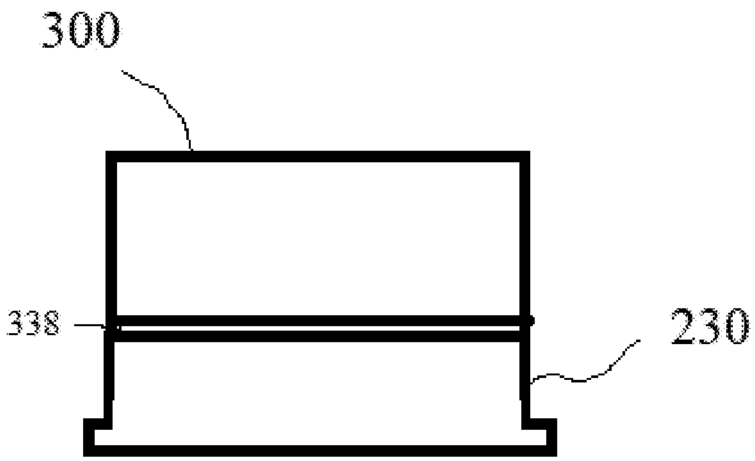
FIGS. 18A-18D illustrate example alternatives for adding a container lid with dosage reminder indicator to existing cap designs according to one or more embodiments of the present disclosure.
Figure 18B:
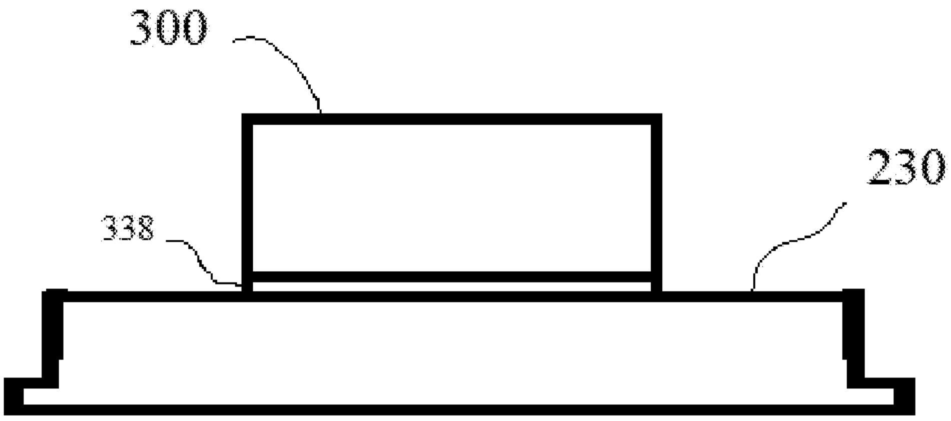
Figure 18C:
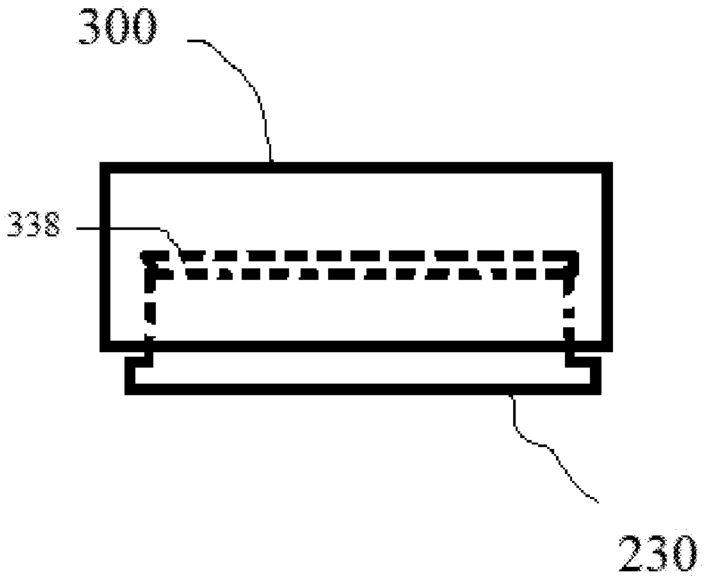
Figure 18D:
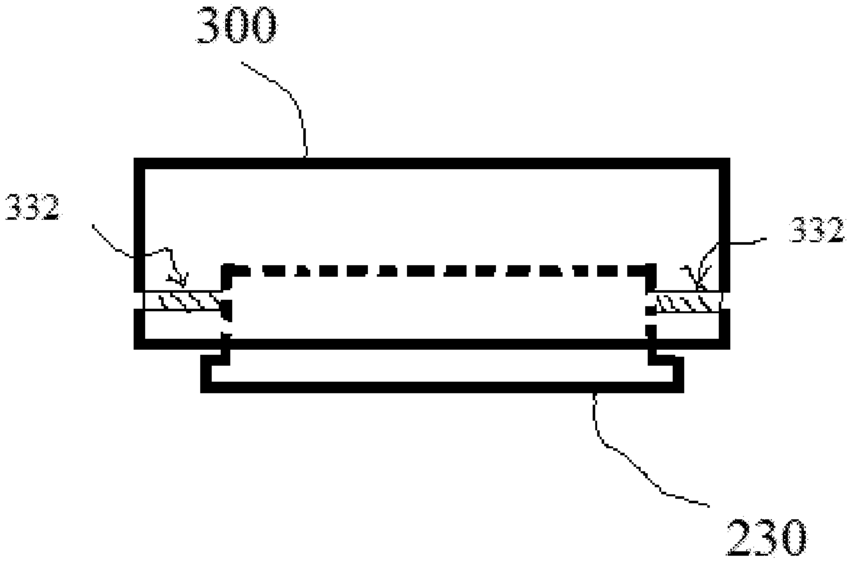

Additional or alternative embodiments herein are also provided for situations where the container cap 300 is configured as an add-on to an existing container lid/cap. For instance, FIGS. 18A-18D illustrate example alternatives for adding a container lid 300 with dosage reminder indicator (e.g., dial 310 and ring 320) to existing designs of lids/caps 230 according to one or more embodiments of the present disclosure. For instance, since there are many different sizes and closures of containers 200, the techniques herein further provide for embodiments that allow the novel container lid 300 to be added to an existing cap, such as where the lid 300 is sold to consumers as an add-on accessory. As shown in the simplified FIGS. 18A-18D, for example, the novel container lid 300 may be adhered to the top of a similarly sized container lid 230 (FIG. 18A), or to any sized (e.g., larger) container lid 230 (FIG. 18B), using various adhesion mechanisms 338, such as adhesives, glues, stick-pads, double-sided tapes, hook-and-loop fasteners (e.g., VELCRO®), suction cups, and so on, that would secure the novel container lid 300 with dosage reminder indicator(s) to the original container lid 230, whether as a one-time usage or as a removeable and reusable configuration. As shown in FIGS. 18C and 18D, the novel container lid 300 with dosage reminder indicator(s) may also have a recessed portion on the bottom to allow insertion (full or partial insertion) of the original cap 230, which again may be secured by various mechanisms (e.g., adhesives, etc.), compression (e.g., snapping on, pressing on, clutching or clamping on, etc.), or as shown in FIG. 18D, through various securing mechanisms such as set screws 332. Essentially, the designs in FIGS. 18C and 18D (and also 18A-18B) are similar to the modular closure design described above, where instead of a separate closure mechanism 328, the actual original cap 230 becomes the closure mechanism (i.e., 328/228, combined) for the lid 300 to mate with the original container 200.

Figure 19A:
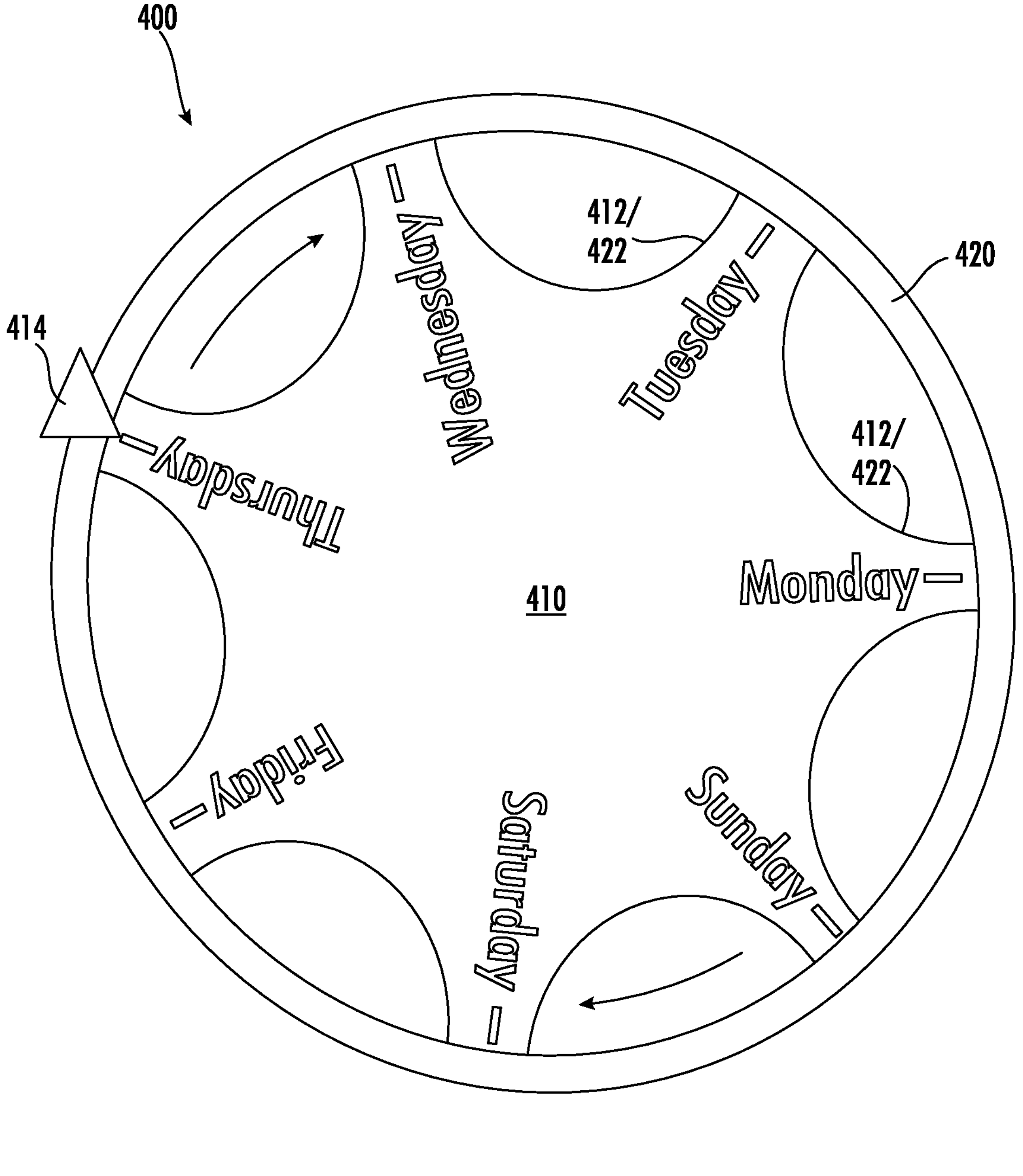
FIGS. 19A-19B illustrate an example of an alternative design with the rotating dial having dosage timing indicators and the stationary ring having the dosage reminder indicator according to one or more embodiments of the present disclosure.
Figure 19B:
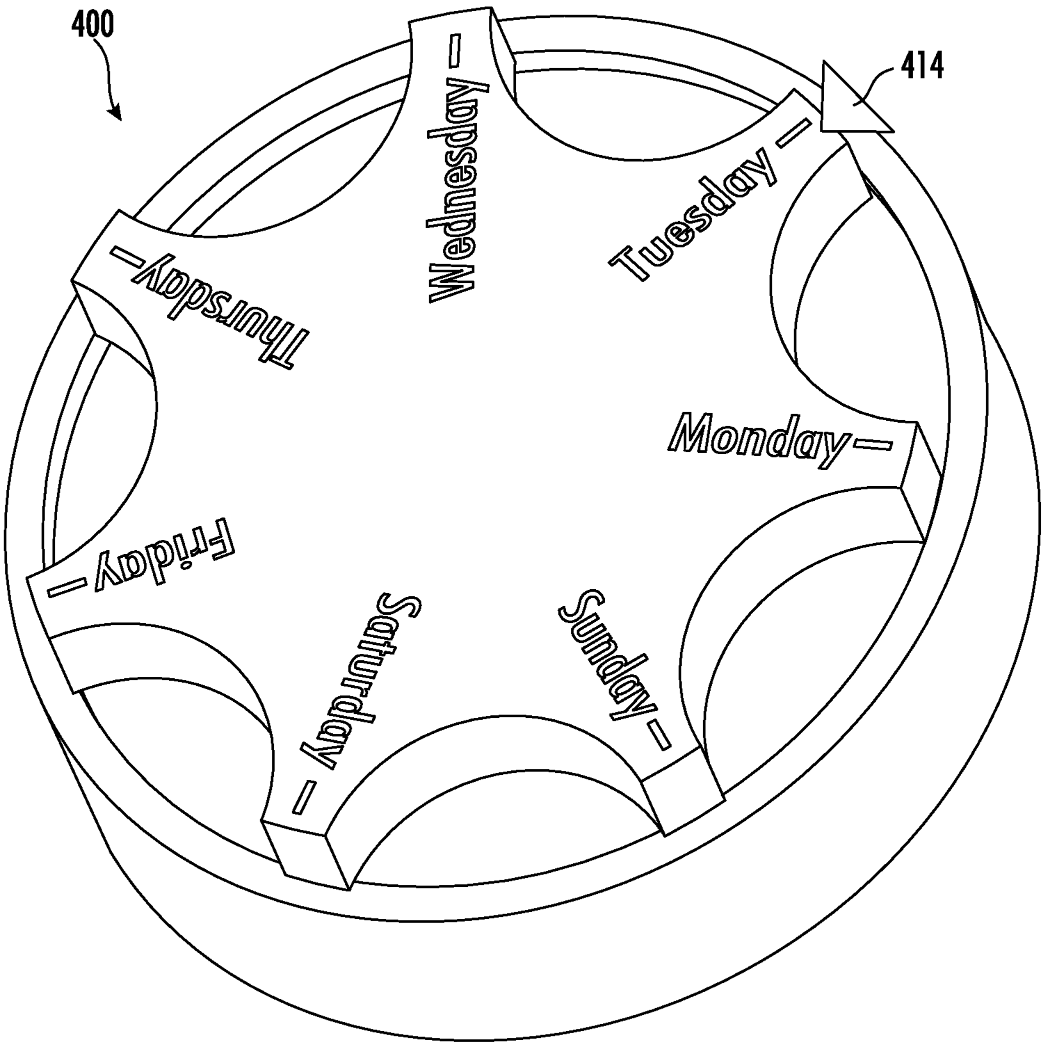

Alternative and/or additional embodiments of the container lid with dosage reminder indicator are shown in FIGS. 19A-20C. For example, FIGS. 19A-19B illustrate still another design of the container lid 400 where the rotating dial 410 itself comprises the dosage timing indicators 422 (e.g., days of the week, days plus AM/PM, etc.), and the next/last dosage reminder indicator 414 is located on the stationary outer ring 420. In particular, though the above examples have a singular grip member 412 with a plurality of dosage timing indicators 422, in FIGS. 19A-19B, the dial 410 has a plurality of combination grip/timing members 412/422 that provide multiple finger contact points as well as corresponding dosage timing indicators that can be turned to align with the next/last dosage reminder indicator 414 that is now on the outer stationary ring 420.

Figure 20A:
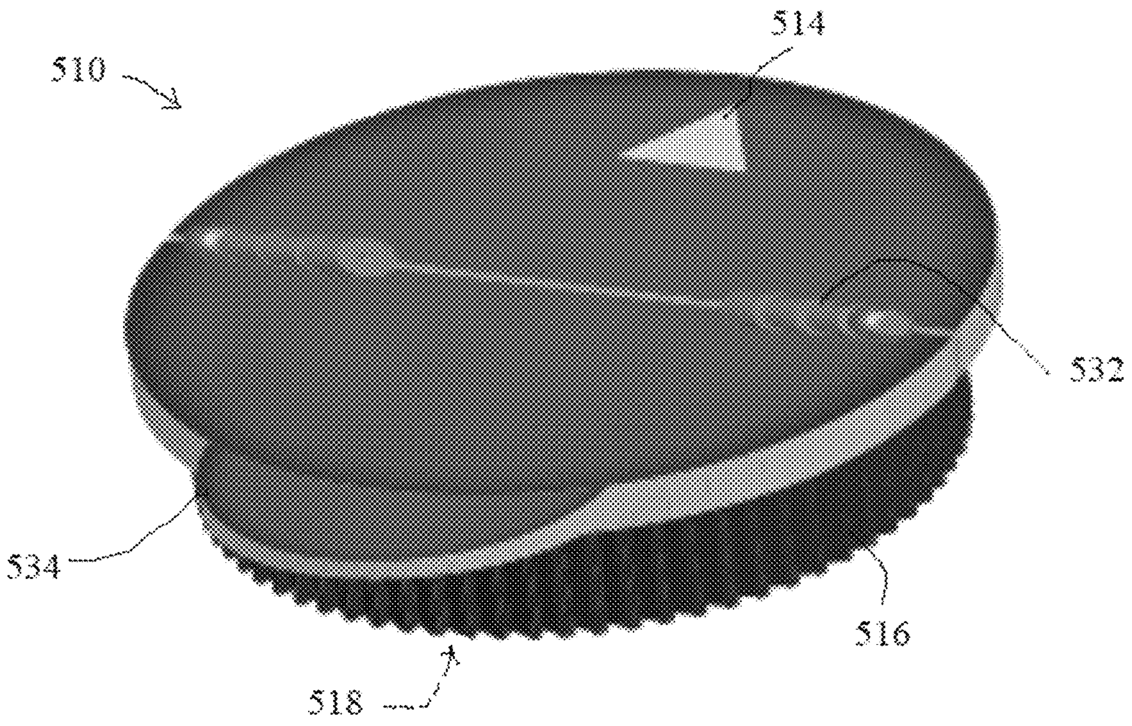
FIGS. 20A-20C illustrate an example of another alternative design with a stationary pop-top having a dosage reminder indicator and a rotating outer ring with dosage timing indicators according to one or more embodiments of the present disclosure.
Figure 20B:
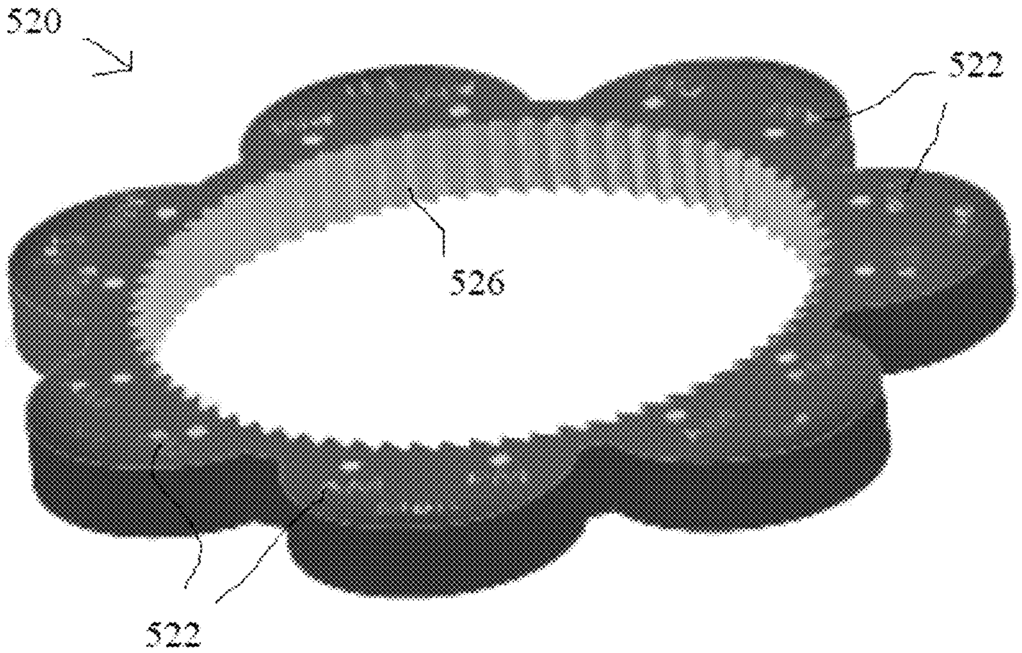
Figure 20C:
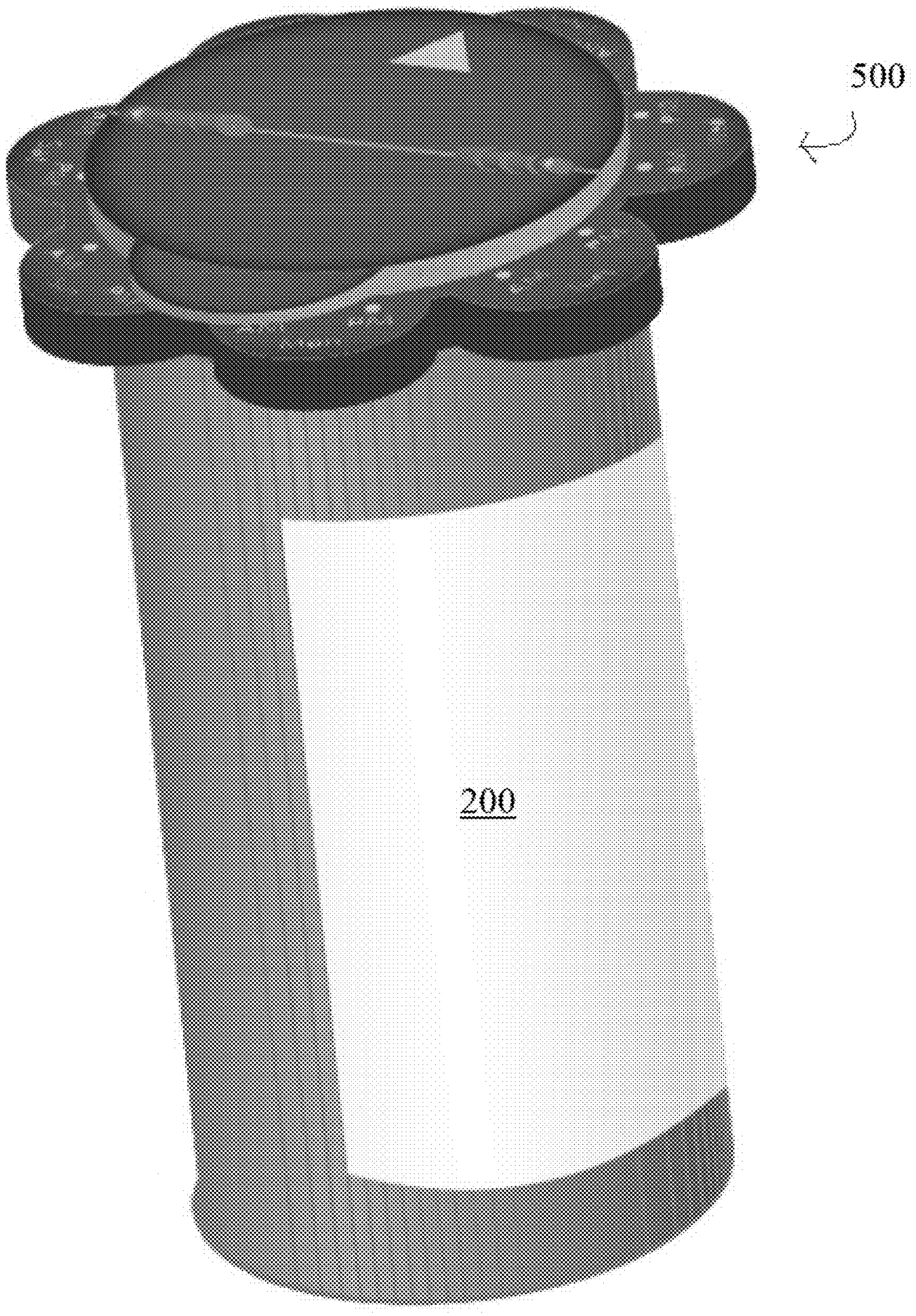

Additionally, in another example alternative shown in FIGS. 20A-20C, the lid 500 may comprise a center portion 510 that is a stationary flip-top/pop-top (hinge open cap) affixing to the container 200 (e.g., with threads/etc. 518), where having a dosage reminder indicator 514, once closed onto the container, remains in place, such that the rotating outer ring 520 with dosage timing indicators 522 can be turned (moving flexible members 516 within receiving detents 526) to align with the stationary dosage reminder indicator 514, accordingly. The hinges 532 allow for lifting of the handle 534 to open the lid 500 to expose the contents of the container 200, accordingly.

Figure 21:
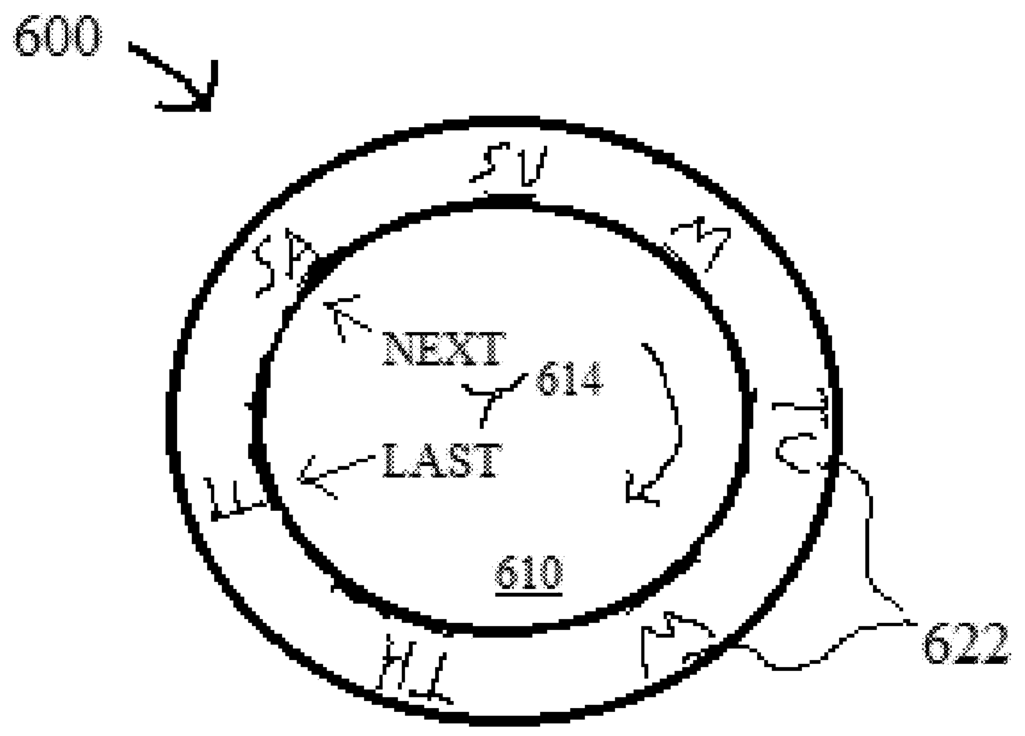
FIG. 21 illustrates an example of another alternative design with a multiple dosage reminder indicators according to one or more embodiments of the present disclosure.

In addition, though only a single next/last dosage reminder indicator is shown above, the techniques herein may also include both a last indicator and a next indicator, to avoid confusion. For instance, as shown in FIG. 21, for daily use, for example, assume two indicators 614 of the device 600 may have one "LAST" indicator pointing to the timing indicator 622 of the day last taken (e.g., Friday) and a "NEXT" indicator pointing to the next day to take the dosage (e.g., Saturday). Then, in this example, when the dose is next taken on the Saturday, turning the rotating dial 610 would result in the LAST indicator pointing to Saturday, and the NEXT indicator now pointing to Sunday.

As can be seen, many different configurations of the dial and outer ring are contemplated herein, and any variation in design (e.g., shapes, sizes, numbers of indicators, etc.) that remains within the functionality of the description herein is generally considered to be encompassed by the present disclosure as a mere design choice, whenever the core functionality of a reminder indicator and a timing indicator co-configured to allow for positionally secured rotation for alignment of a next/last dosage indication, accordingly.

Advantageously, the embodiments herein thus provide for a dosage reminder indicator for container lids (or containers generally) that is easy to use, reduces erroneous movement, and effectively provides for increased dosage adherence. In particular, a user can confidently determine whether they have already taken a dose or when their next dose is due, simply by looking at their indicator/container lid which they adjusted by turning the dial during their last dose. The techniques herein require minimal training, avoids inadvertent moving of dials, switches, levers, buttons, etc., and requires no batteries or expensive parts to manufacture. Additionally, the indicator/container lid embodiments herein can be configured for distribution with a corresponding container, being an appropriate configuration for that container, or can be purchased separately by consumers in a configuration that matches their particular containers. Furthermore, the optionally modular designs allow an even greater number of customizable configurations for sizes, closure mechanisms, dosage timing, and so on, as mentioned above.

Notably, the embodiments herein have further advantages over current reminder caps on the market today that are worth mentioning herein. In particular, the embodiments herein have the rotating dial located externally to the closed container, which allows for adjustment without having to open the container, while still being sufficiently secure to prevent inadvertent adjustment. Also, the techniques herein do not rely on compression of the lid closed against the container to secure the rotating dial, which can be difficult to set in a desired location and remain in that position while closing the lid (i.e., the rotating dial herein does not risk being inadvertently adjusted during closing of the lid against the container). This is especially true where particular dials on the market today are only secured against disengaging from the cap based on the closure threads extending outwardly enough to prevent such disengagement. Such clumsy designs may offer the advantage of indicating a last/next dose, but suffer from being difficult to use and generally being not user friendly, unlike the embodiments herein.

In closing: an illustrative apparatus according to one or more embodiments of the present disclosure may comprise: an inner dial having one or more first engaging members; an outer ring having one or more second engaging members mating with one or more of the one or more first engaging members; a dosage reminder indicator on one of either the inner dial or the outer ring; a plurality of dosage timing indicators on the other of either the inner dial or the outer ring; wherein the inner dial and the outer ring are rotatably engaged with respect to each other such that the dosage reminder indicator points to any of a selected one of the plurality of dosage timing indicators in a secured position when one or more of the one or more first engaging members are mated with one or more of the one or more second engaging members; and wherein rotation between the inner dial and the outer ring is permitted based on user-applied force to disengage mating of the one or more first engaging members from the one or more second engaging members while the inner dial and the outer ring remain rotatably engaged.

In one embodiment, the apparatus further comprises: a spring mechanism configured to press the inner dial against the outer ring, wherein the user-applied force comprises pushing on the one of either the inner dial or the outer ring to disengage mating of the one or more first engaging members from the one or more second engaging members while the inner dial and the outer ring remain rotatably engaged and rotation between the inner dial and the outer ring is thus permitted. In one embodiment, one of either the one or more first engaging members or the one or more second engaging members comprise raised tabs, and wherein the other of either the one or more first engaging members or the one or more second engaging members comprise receptive detents, and wherein the raised tabs are mated with receptive detents when engaged, and rotation between the inner dial and the outer ring is permitted based on user-applied force disengaging mating of the raised tabs from the receptive detents and allowing the raised tabs to pass by the receptive detents while the inner dial and the outer ring remain rotatably engaged. In one embodiment, the spring mechanism is selected from a group consisting of: one or more leaf springs; one or more compression coil springs; and one or more cantilever springs. In one embodiment, the apparatus further comprises: a base plate engaged securely with the outer ring, and wherein the spring mechanism presses between the inner dial and the base plate. In one embodiment, the spring mechanism is affixed to the base plate. In one embodiment, the base plate is a lid for a container, the lid having a closure mechanism to mate with the container. In one embodiment, the spring mechanism is affixed to the inner dial.

In one embodiment, one of either the one or more first engaging members or the one or more second engaging members comprise flexible protruding members, and the other of either the one or more first engaging members or the one or more second engaging members comprise receptive detents, and wherein the flexible protruding members are mated with receptive detents when engaged, and rotation between the inner dial and the outer ring is permitted based on user-applied force flexibly disengaging mating of the flexible protruding members from the receptive detents and allowing the flexible protruding members to pass by the receptive detents in a flexed state while the inner dial and the outer ring remain rotatably engaged. In one embodiment, the flexible protruding members and receptive detents are arranged in a one-way ratcheting orientation.

In one embodiment, a portion of the outer ring is configured as a lid for a container, the lid having a closure mechanism to mate with the container.

In one embodiment, the dosage reminder indicator is selected from a group consisting of: an arrow; and a triangle.

In one embodiment, the plurality of dosage timing indicators comprise indicators selected from a group consisting of: days of a week; mornings and evenings of days of a week; hours of a day; days of a month; and months of a year.

In one embodiment, the plurality of dosage timing indicators are selected from a group consisting of: molded indicators; etched indicators; ink-printed indicators; 3D-printed indicators; ink-stamped indicators; die-stamped indicators; and one or more stickers.

In one embodiment, a number of the one or more first engaging members is different from a number of the one or more second engaging members.

In one embodiment, the apparatus further comprises: a grip member extending from the inner dial upon which the user-applied force is to be applied. In one embodiment, the grip member is the dosage reminder indicator.

In one embodiment, the apparatus further comprises: a fastening mechanism to affix the apparatus to a portion of a container. In one embodiment, the portion of the container is a lid for the container. In one embodiment, the fastening mechanism is selected from a group consisting of: adhesive tape; a dried adhesive; hook and loop fasteners; one or more suction cups; and one or more screws.

In one embodiment, a portion of the inner dial is configured as a lid for a container, the lid having a closure mechanism to mate with the container. In one embodiment, the inner dial comprises a flip-top lid.

In one embodiment, the dosage reminder indicator comprises both a next dose indicator and a previous dose indicator in static relation to each other, wherein when the next dose indicator points to a particular one of the plurality of dosage timing indicators the previous dose indicator correspondingly points to a previous one of the plurality of dosage timing indicators.

In one embodiment, the apparatus is a lid for a container.

In one embodiment, the apparatus is configured to affix to a lid of a bottle.

The foregoing description has been directed to specific embodiments. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. An apparatus, comprising:

an inner dial having one or more first engaging members;

an outer ring having one or more second engaging members mating with one or more of the one or more first engaging members;

a spring mechanism that is configured to press the inner dial against the outer ring;

a dosage reminder indicator on one of either the inner dial or the outer ring;

a plurality of dosage timing indicators on the other of either the inner dial or the outer ring;

wherein the inner dial and the outer ring are rotatably engaged with respect to each other such that the dosage reminder indicator points to any of a selected one of the plurality of dosage timing indicators in a secured position, caused by the spring mechanism, when one or more of the one or more first engaging members are mated with one or more of the one or more second engaging members; and wherein bidirectional rotation between the inner dial and the outer ring is permitted based on user-applied force counter to the spring mechanism, to disengage mating of the one or more first engaging members from the one or more second engaging members while the inner dial and the outer ring remain rotatably engaged.

2. An apparatus as in claim 1, wherein one of either the one or more first engaging members or the one or more second engaging members comprise raised tabs, and wherein the other of either the one or more first engaging members or the one or more second engaging members comprise receptive detents, and wherein the raised tabs are mated with receptive detents when engaged, and rotation between the inner dial and the outer ring is permitted based on user-applied force disengaging mating of the raised tabs from the receptive detents and allowing the raised tabs to pass by the receptive detents while the inner dial and the outer ring remain rotatably engaged.

3. An apparatus as in claim 1, wherein the spring mechanism is selected from a group consisting of: one or more leaf springs; one or more compression coil springs; and one or more cantilever springs.

4. An apparatus as in claim 1, further comprising:

a base plate engaged securely with the outer ring, and wherein the spring mechanism presses between the inner dial and the base plate.

5. An apparatus as in claim 4, wherein the spring mechanism is affixed to the base plate.

6. An apparatus as in claim 4, wherein the base plate is a lid for a container, the lid having a closure mechanism to mate with the container.

7. An apparatus as in claim 1, wherein the spring mechanism is affixed to the inner dial.

8. An apparatus as in claim 1, wherein one of either the one or more first engaging members or the one or more second engaging members comprise flexible protruding members, and wherein the other of either the one or more first engaging members or the one or more second engaging members comprise receptive detents, and wherein the flexible protruding members are mated with receptive detents when engaged, and rotation between the inner dial and the outer ring is permitted based on user-applied force flexibly disengaging mating of the flexible protruding members from the receptive detents and allowing the flexible protruding members to pass by the receptive detents while the inner dial and the outer ring remain rotatably engaged.

9. An apparatus as in claim 8, wherein the flexible protruding members and receptive detents are arranged in a one-way ratcheting orientation.

10. An apparatus as in claim 1, a portion of the outer ring is configured as a lid for a container, the lid having a closure mechanism to mate with the container.

11. An apparatus as in claim 1, wherein the dosage reminder indicator is selected from a group consisting of: an arrow; and a triangle.

12. An apparatus as in claim 1, wherein the plurality of dosage timing indicators comprise indicators selected from a group consisting of: days of a week; mornings and evenings of days of a week; hours of a day; days of a month; and months of a year.

13. An apparatus as in claim 1, wherein the plurality of dosage timing indicators are selected from a group consisting of: molded indicators; etched indicators; ink-printed indicators; 3D-printed indicators; ink-stamped indicators; die-stamped indicators; and one or more stickers.

14. An apparatus as in claim 1, wherein a number of the one or more first engaging members is different from a number of the one or more second engaging members.

15. An apparatus as in claim 1, further comprising:

a grip member extending from the inner dial upon which the user-applied force is to be applied.

16. An apparatus as in claim 15, wherein the grip member is the dosage reminder indicator.

17. An apparatus as in claim 1, further comprising:

a fastening mechanism to affix the apparatus to a portion of a container.

18. An apparatus as in claim 17, wherein the portion of the container is a lid for the container.

19. An apparatus as in claim 17, wherein the fastening mechanism is selected from a group consisting of: adhesive tape; a dried adhesive; hook and loop fasteners; one or more suction cups; and one or more screws.

20. An apparatus as in claim 1, wherein a portion of the inner dial is configured as a lid for a container, the lid having a closure mechanism to mate with the container.

21. An apparatus as in claim 20, wherein the inner dial comprises a flip-top lid.

22. An apparatus as in claim 1, wherein the dosage reminder indicator comprises both a next dose indicator and a previous dose indicator in static relation to each other, wherein when the next dose indicator points to a particular one of the plurality of dosage timing indicators the previous dose indicator correspondingly points to a previous one of the plurality of dosage timing indicators.

23. An apparatus as in claim 1, wherein the apparatus is a lid for a container.

24. An apparatus as in claim 1, wherein the apparatus is configured to affix to a lid of a bottle.

* * * * *